(12) United States Patent
Oberstein

(10) Patent No.: US 8,677,263 B2
(45) Date of Patent: Mar. 18, 2014

(54) PAN GRIP CONTROLS

(76) Inventor: Tobias Gregor Oberstein, Herzogenaurach (DE)

( * ) Notice: Subject to any disclaimer, the term of this patent is extended or adjusted under 35 U.S.C. 154(b) by 432 days.

(21) Appl. No.: 12/962,679

(22) Filed: Dec. 8, 2010

(65) Prior Publication Data

US 2012/0151406 A1 Jun. 14, 2012

(51) Int. Cl.
*G06F 3/048* (2013.01)
(52) U.S. Cl.
USPC .......................................... 715/784; 715/781
(58) Field of Classification Search
USPC .......................................... 715/784, 781, 817
See application file for complete search history.

(56) References Cited

U.S. PATENT DOCUMENTS

| 5,568,603 | A | 10/1996 | Chen et al. |
| 6,037,937 | A | 3/2000 | Beaton et al. |
| 7,415,676 | B2 | 8/2008 | Fujita |
| 7,434,173 | B2 | 10/2008 | Jarrett et al. |
| 7,519,920 | B2 | 4/2009 | Jarrett et al. |
| 2004/0141010 | A1* | 7/2004 | Fitzmaurice et al. .......... 345/810 |
| 2007/0097150 | A1* | 5/2007 | Ivashin et al. ................. 345/660 |
| 2008/0082940 | A1* | 4/2008 | Morris .......................... 715/786 |
| 2010/0039400 | A1* | 2/2010 | Jang ............................. 715/784 |

* cited by examiner

*Primary Examiner* — Weilun Lo
*Assistant Examiner* — Dino Kujundzic

(57) ABSTRACT

A viewport displays a portion of content that is larger than the viewport. Within this viewport pan grip controls are displayed. The pan grip controls are active zones in the viewport receptive to user input and may have a graphical representation. They are presented at positions relative to the content as displayed in the viewport, and in some embodiments, in a predetermined, regular pattern that is independent of the displayed content. The viewport is panned in response to panning input received on the pan grip controls. The panning input may be a dragging of a pan grip control. The pan grip controls maintain their positions relative to the content as displayed in the viewport. Non-panning input on the displayed content is received outside of the pan grip controls.

32 Claims, 31 Drawing Sheets

PAN GRIP CONTROLS

FIELD OF THE INVENTION

The present invention relates to graphical user interfaces for computers. More specifically, it relates to panning of a viewport, employing pan grip controls.

BACKGROUND

Any discussion of third party references throughout the specification should in no way be considered as an admission that such references are widely known or form part of common general knowledge in the field.

Content that is to be displayed on a screen or on a part thereof, such as in a window, is often of a size that allows only the display of a part of it. The displayed part is then often changed through scrolling or panning. Methods currently used to control this scrolling or panning include, among others, cursor keys and page up/down keys, scroll wheels on mice, scroll zones on touch pads, on-screen scroll buttons, scroll bars, direct scrolling, such as the ADOBE® Hand Tool in the ADOBE® READER® viewer application and automatic scrolling.

SUMMARY

A computing device and a method for the implementation of pan grip controls that facilitate modeless panning are described herein.

A viewport displays a portion of content that is larger than the viewport. Within this viewport pan grip controls are displayed. The pan grip controls are active zones in the viewport receptive to user input and may have a graphical representation. They are presented at positions relative to the content as displayed in the viewport, and in some embodiments in a predetermined, regular pattern that is independent of the displayed content. The viewport is panned in response to panning input received on the pan grip controls. The panning input may be a dragging of a pan grip control. The pan grip controls maintain their positions relative to the content as displayed in the viewport. Non-panning input on the displayed content may be received outside of the pan grip controls.

DETAILED DESCRIPTION

Figure 1:
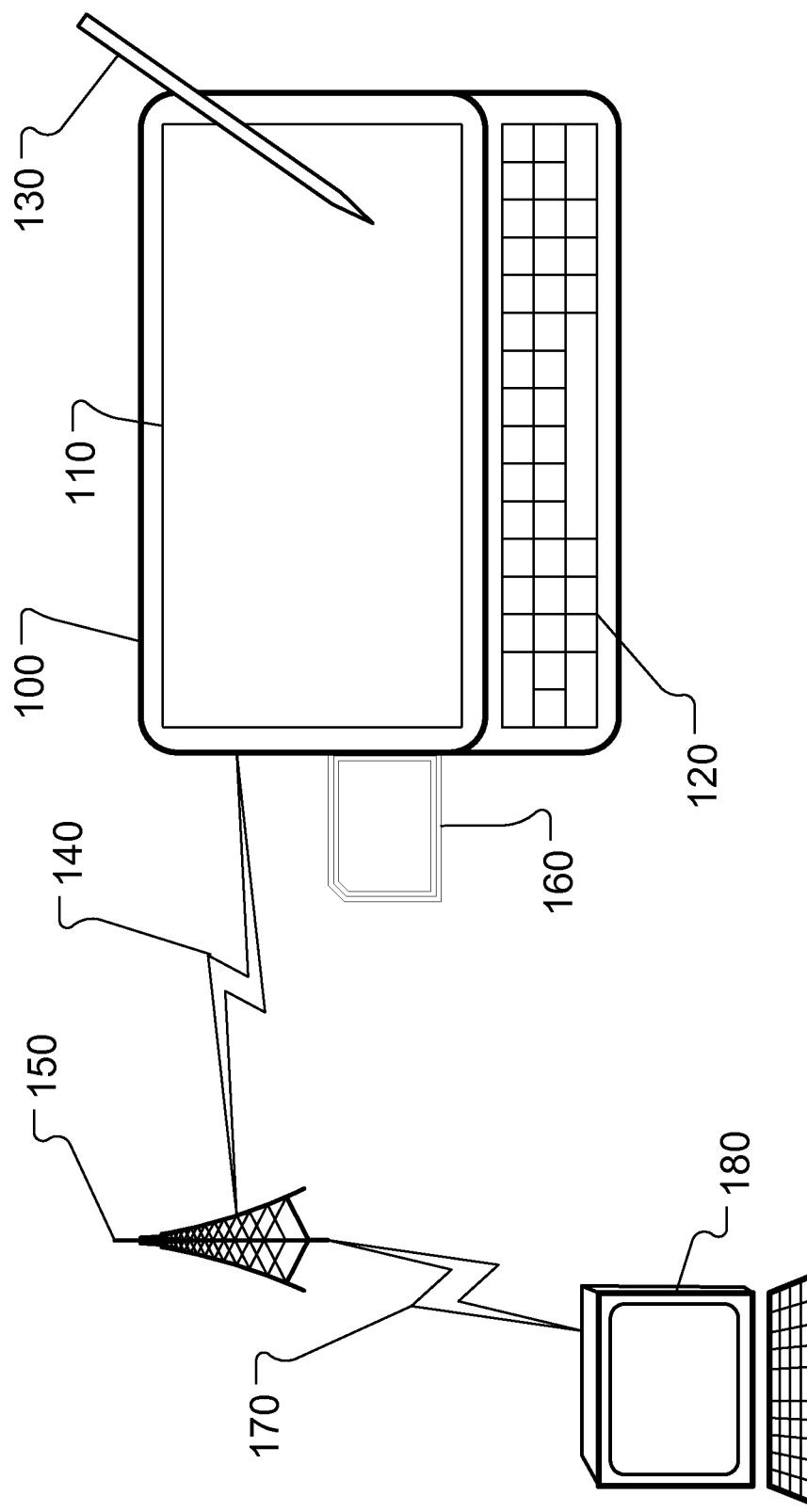
FIG. 1 illustrates a computing device suitable for implementing the present invention.

Described herein are a computing device and a method suitable for the implementation of pan grip controls. In the course of this description, reference is made to the accompanying drawings that form a part hereof. Like reference numerals are used to refer to like elements throughout.

While specific configurations, features and arrangements are shown in the drawings and discussed, this is done for illustrative purposes only. A person skilled in the art will recognize that they can practice other embodiments of the invention without one or more of the steps, features or components described below, and that other configurations, features and arrangements may be used without departing from the spirit and scope of the invention.

For the sake of brevity, certain well-known details often associated with computing and software technology are not set forth in the following disclosure. In some cases, well-known structures and devices are shown in block diagram form in order to facilitate describing these elements.

In addition, the embodiments described herein may be implemented as a method or apparatus using commonly known programming and/or engineering techniques to produce software, firmware, hardware or any combination thereof to control a computer to implement the disclosed embodiments.

When reference is made to a mobile computing device it should be understood that other computing devices having the necessary components may be used to implement the invention.

Computing Device

A computing device suitable for an implementation of pan grip controls is illustrated in FIG. 1. It is illustrated as a mobile computing device 100 which is connected to a wireless data network 150 through a wireless connection 140. Other network connections such as, but not limited to, wired Ethernet networks are also possible, and it should be appreciated that the principles of the invention may be utilized as well by devices that are not connected to a computer network.

The mobile computing device 100 includes a display 110. In the present illustration, a touch screen 110 for operation with a stylus 130 is shown, so that the display doubles as a pointing device. Other pointing devices such as, but not limited to, dedicated hardware keys, D-pads, mice, digitizer tablets, resistive or capacitive touch screens intended for finger or stylus operation or analogue joysticks may be used as well. Mass storage may be fixed internally, be provided through a removable storage means such as one or more flash memory storage cards 160, or be connected to the computing device externally, such as through a data network. The device may also include a keyboard 120. In addition to or instead of the touch screen 110 and the keyboard 120 other input devices such as dedicated hardware keys, D-pads, mice, digitizer tablets, resistive or capacitive touch screens intended for finger or stylus operation or analogue joysticks may be used. The mobile computing device 100 operates under the control of an operating system, and executes various computer software applications as well as system processes. In a device connected to a data network computer software applications or some of their processes, including components of the present invention, may also be executed on a server or other computer 180 connected to the network by, for example, but not limited to, another wireless connection 170. The computer display 110 may be any type of display such as, most usually, but not limited to, an LCD, or an OLED.

Examples of a computing device suitable for implementation of pan grip controls are mobile internet devices such as the NOKIA® N800, N810, smartphones such as the NOKIA® N97 or HTC® Desire, tablet computers such as the LENOVO® THINKPAD® X60t, X201t, HEWLETT-PACKARD® ELITEBOOK® 2740p, notebook computers such as the LENOVO® THINKPAD® T400, HEWLETT-PACKARD® PROBOOK® 5310m and desktop systems such as the DELL® Studio One 19.

Suitable Architecture

Figure 2:
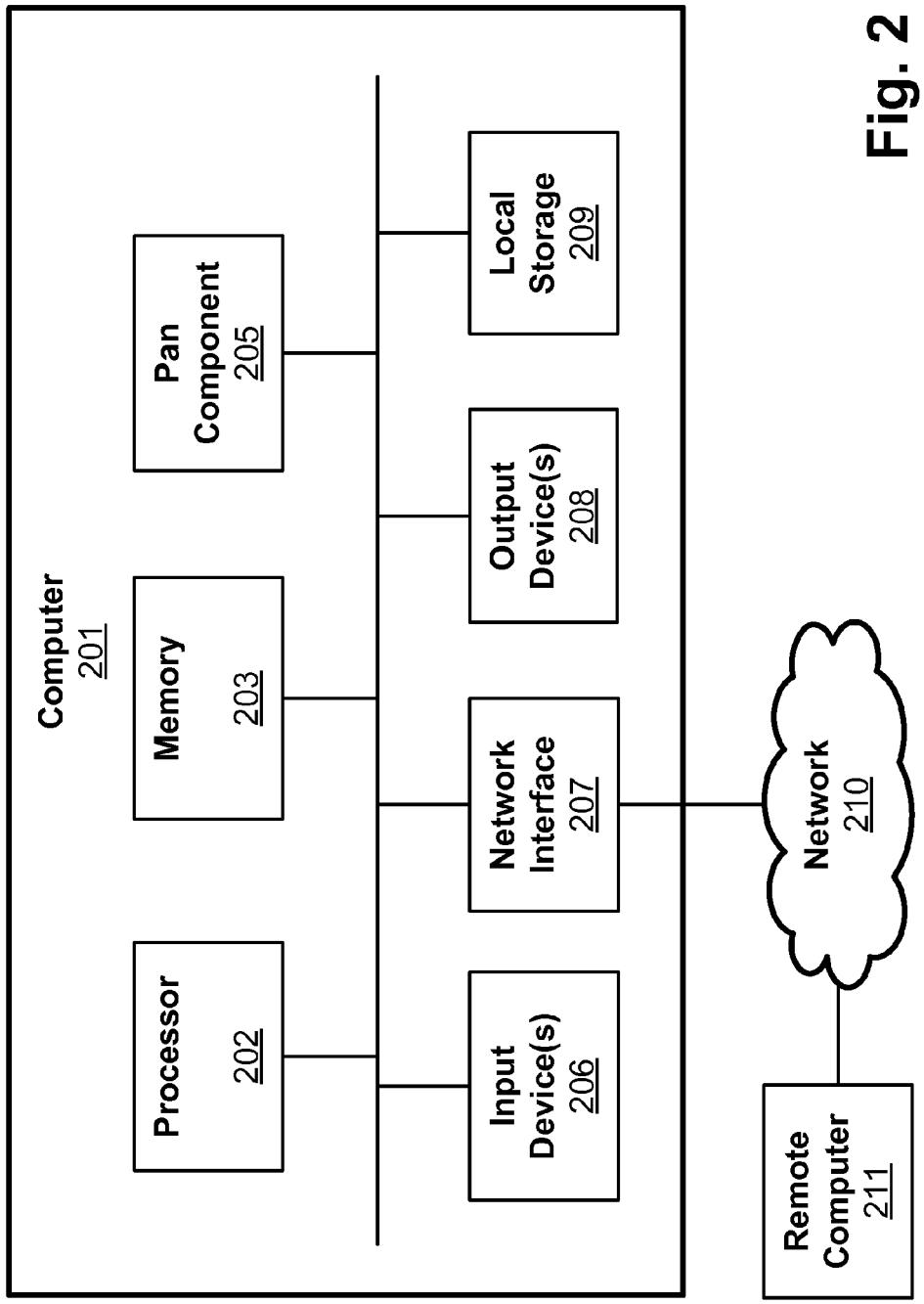
FIG. 2 illustrates a system architecture suitable for implementing the present invention.

FIG. 2 is a block diagram of a suitable architecture 200 (e.g. hardware architecture) for implementing at least one embodiment of pan grip controls. The architecture includes a computer 201 that may frequently be connected to one or more remote computers 211 via a network interface 207 and network 210. This network can be any other type of network including a Wi-Fi network, Ethernet network, GSM network, or 3G network. The computer 201 includes at least one processor 202, memory 203, at least one input device 206 which is a pointing device and possibly additional input devices such as, but not limited to, keyboards, cameras, microphones, game pads, and one or more output devices 208, e.g. displays and devices for audio or tactile feedback. The user interacts with the computer through the input and output devices 206, 208. User input relevant to the present invention is processed by a pan component 205 to translate relevant user input into panning the viewport. The computer also includes a local storage device 209, which can be a computer-readable medium. The term "computer-readable medium" refers to any medium that can be part of the process of providing instructions to a processor for execution. This can, amongst others, include non-volatile media (e.g. magnetic or optical disks), volatile media (e.g. random access memory) and transmission media such as electrical busses, radio frequency waves or others. The computer readable medium does not need to be locally connected to the computing device, but may also reside on a remote computing device connected via a network.

Figure 35:
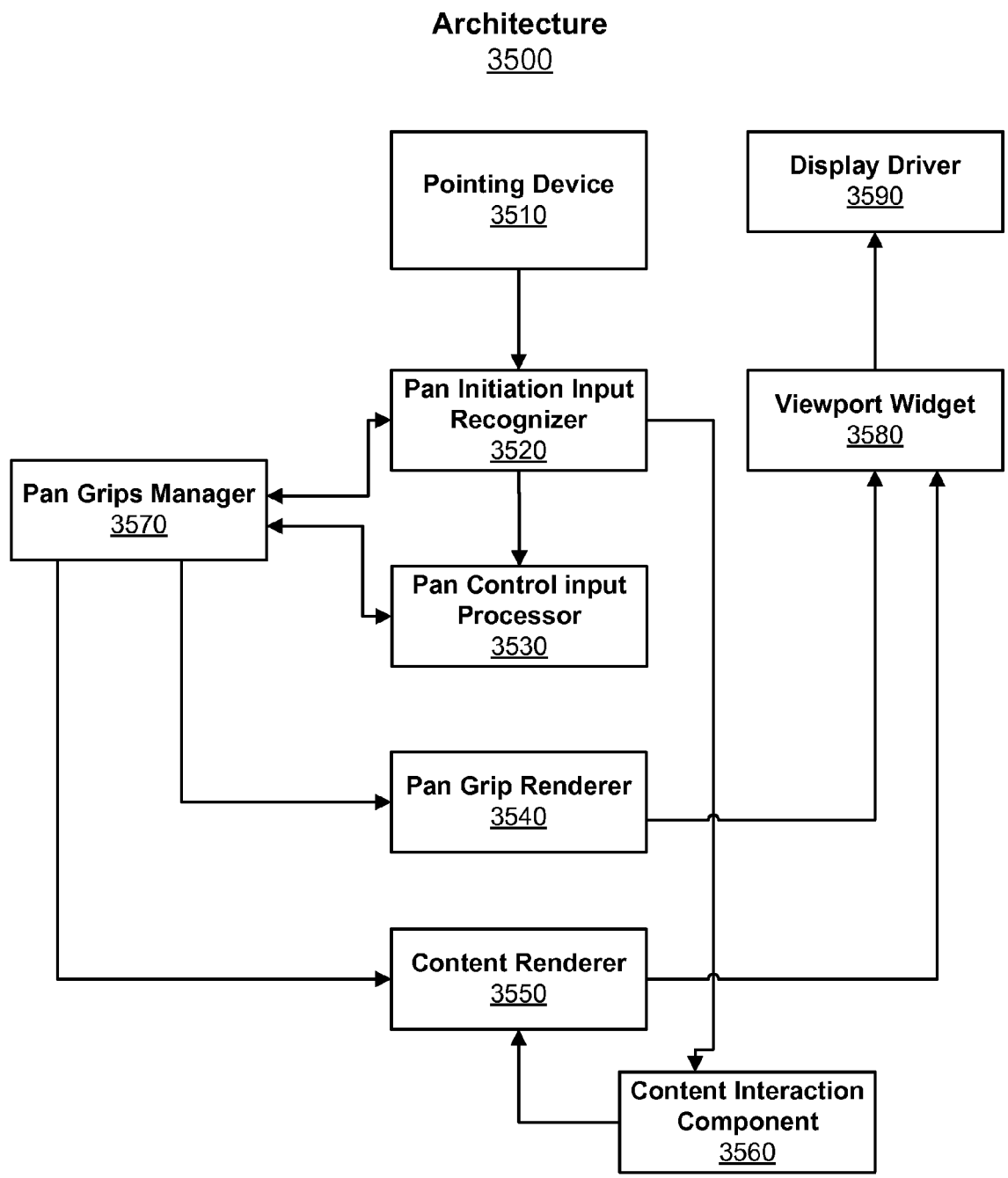
FIG. 35 is a block diagram of a suitable architecture for an embodiment.

FIG. 35 is a block diagram of a suitable architecture 3500 (e.g. software architecture) for implementing at least one embodiment pan grip controls. A pointing device driver 3510 is connected to a pan initiation input recognizer 3520, to which it passes on pointing input. The pan initiation input recognizer 3520 is connected to a pan grips manager 3570, a pan control input processor 3530 and a content interaction component 3560. It passes on input that may relate to content interaction to the content interaction component 3560, and, upon detection of a pan initiation input, passes subsequent input on to the pan control input processor 3530. Both the pan initiation input recognizer 3520 and the pan control input processor 3530 interact with the pan grips manager 3570 which integrates their input regarding the pan grip controls and delivers states regarding the pan grip controls back to them.

The pan grips manager 3570 is further connected to both a pan grip renderer 3540 and a content renderer 3550, to which it passes information regarding the pan grips and the content respectively. The pan grip renderer 3540 is connected to a viewport widget 3580, to which it passes the rendering of the pan grip controls. The content renderer 3550 is connected to both the viewport widget 3580 and a content interaction component 3560, from which it receives changes to the content. The content renderer 3550 passes the rendering of the content on to the viewport widget 3580. The viewport widget 3580 manages both the rendered pan grips and the rendered content and passes these on to a connected display driver 3590 for displaying.

Viewport and Content

Figure 3:
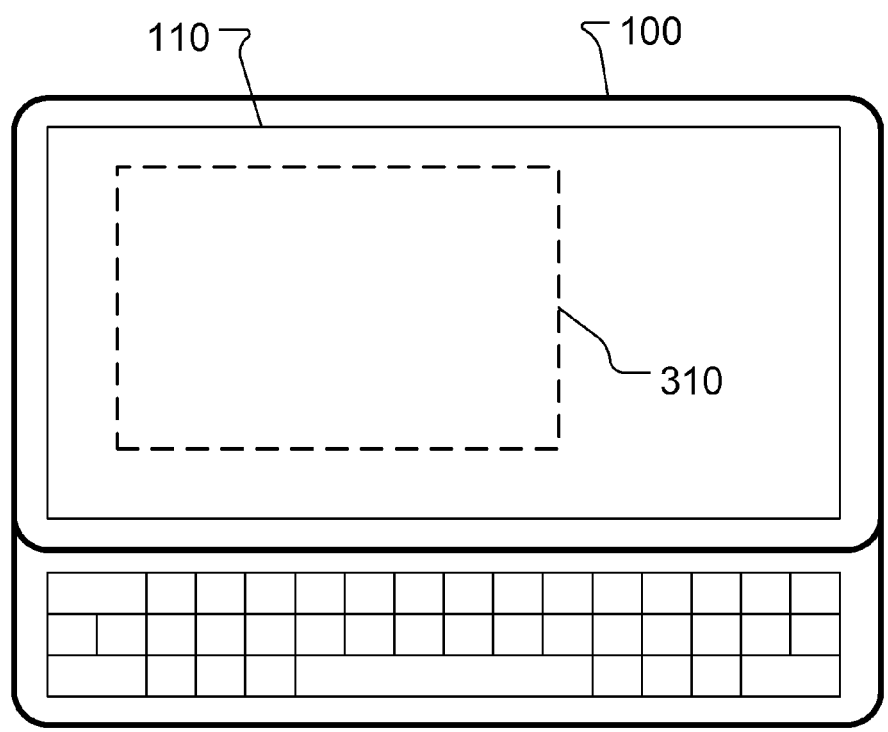
FIG. 3 illustrates a rectangular viewport on a display of a computing device.

FIG. 3 shows a computing device 100 with a display 110 and a viewport 310. The viewport 310 is an area on the display 110 and may be smaller than the size of the display 110.

While a viewport is shown having a rectangular shape and extending further horizontally than vertically, it will be appreciated that other proportions and shapes are possible for a viewport.

Figure 4:
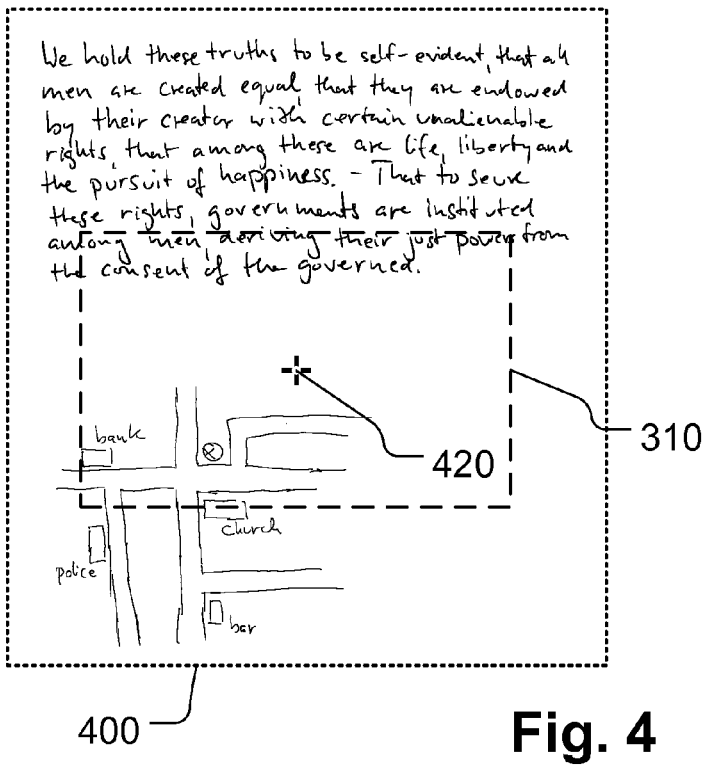
FIG. 4 illustrates a rectangular viewport on content.

FIG. 4 illustrates content 400 with a rectangular viewport 310 that has a center point 420. The viewport displays a portion of the content, referred to herein as 'displayed content', with the entirety of the content being larger than the viewport.

Suitable content may be, but is not limited to, documents (e.g. spreadsheets, word processor documents, html pages, digital ink notes) or media (e.g. drawings, photos, images, presentation slides, and video). The content may contain elements such as, but not limited to, hyperlinks, form elements such as drop-down text boxes, embedded media objects, controls for the playback of embedded media objects, graphics objects, controls for the manipulation of graphics objects or other objects, dynamically updated displays of information, or other active elements. Such elements may form part of the content as such or be added by the program. Such addition may occur for the entire content or be limited to the currently displayed content.

Figure 5:
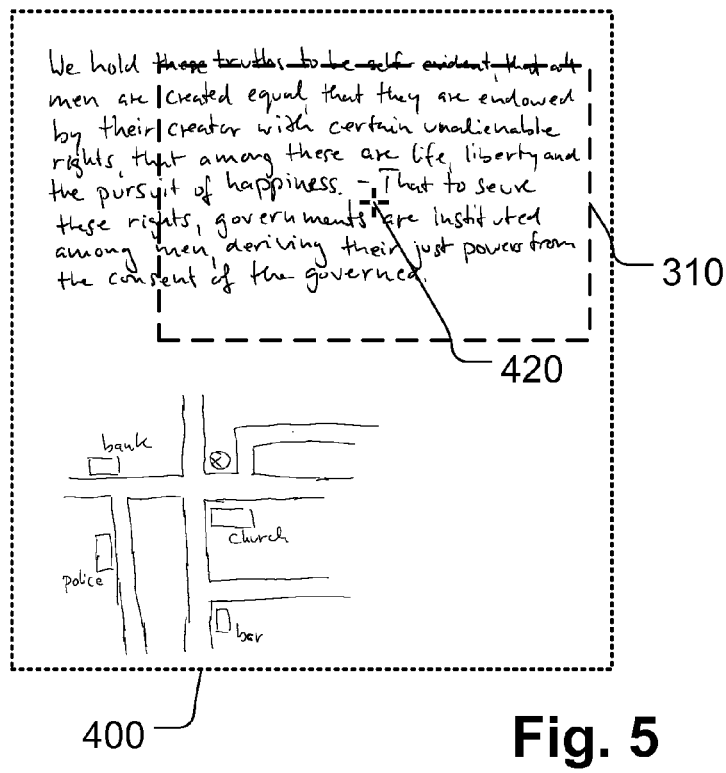
FIG. 5 illustrates a translated rectangular viewport on content.

In FIG. 5 the rectangular viewport 310 with its center point 420 has been translated to a new position, upwards and to the right of its position in FIG. 4.

Figure 6:
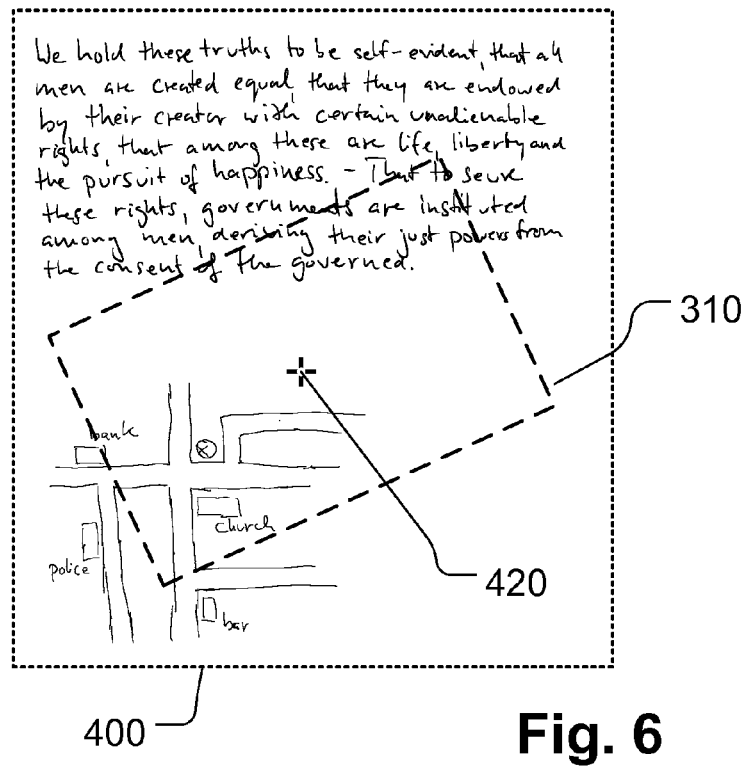
FIG. 6 illustrates a rotated rectangular viewport on content.

FIG. 6 illustrates the rectangular viewport 310 that has been rotated counterclockwise around a center point 420.

Figure 7:
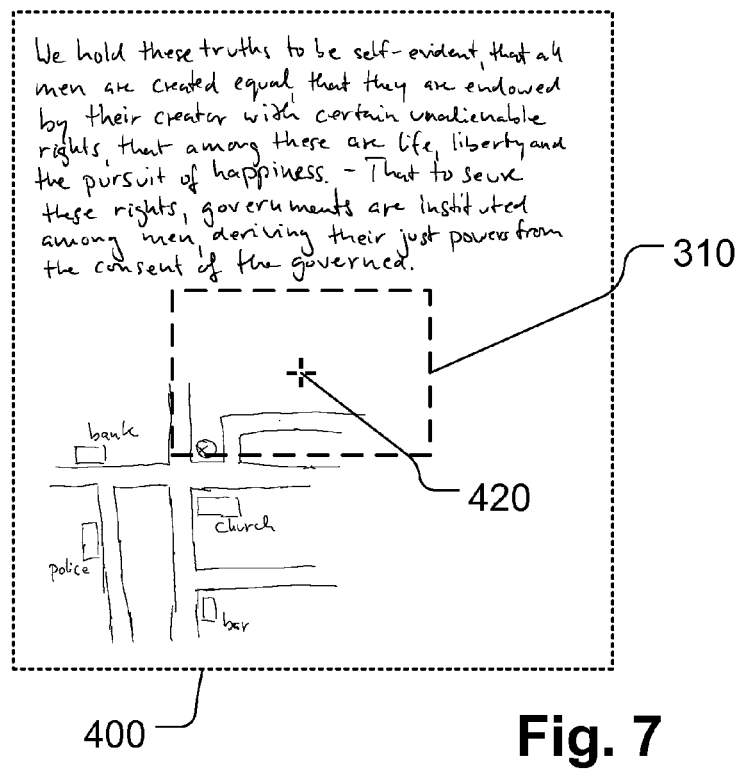
FIG. 7 illustrates a scaled rectangular viewport on content.

FIG. 7 illustrates the rectangular viewport 310 that has been scaled relative to a center point 420. The displayed content appears zoomed compared to that in FIG. 4.

Pan Grip Controls

Figure 8:
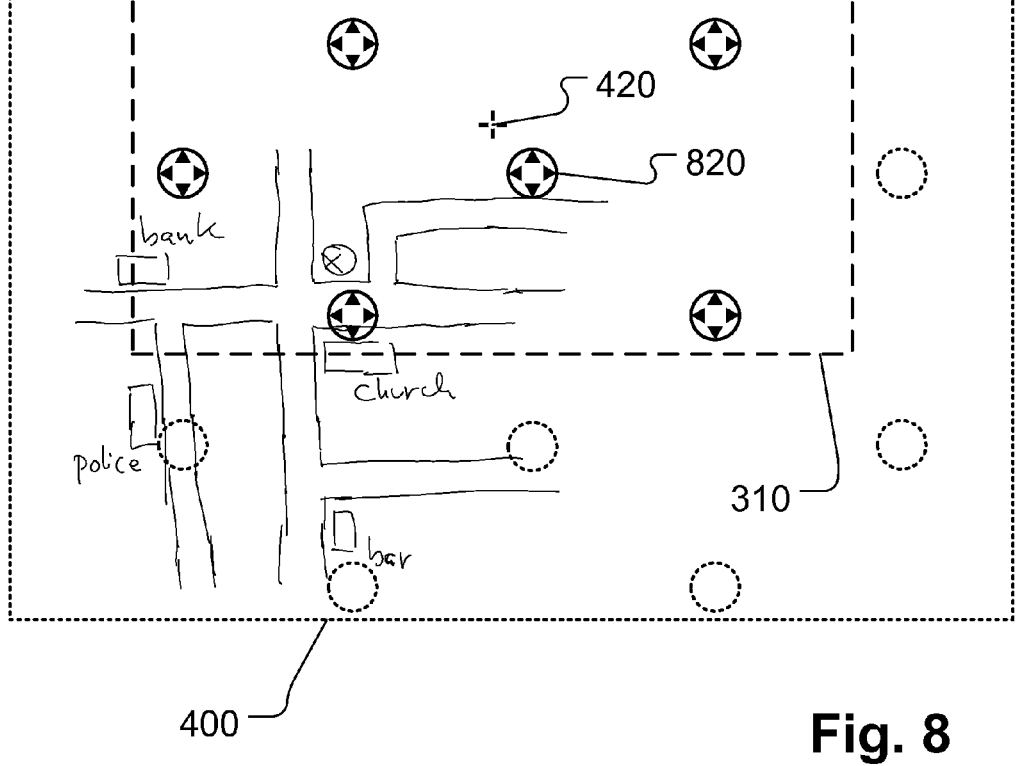
FIG. 8 illustrates a rectangular viewport on content with pan grip controls.

FIG. 8 illustrates content 400, a portion of which is displayed within a rectangular viewport 310. It additionally illustrates pan grip controls such as 810, 820. The pan grip controls are active zones in the viewport receptive to pointer input and may have a graphical representation. The positions of the pan grip controls are determined relative to the content as displayed in the viewport. The position of the pan grip controls may be determined for the entire content, including the content outside of the viewport, independent of a first display of the displayed content, or such positions may only be determined for the currently displayed content. Similarly, a given pan grip control may be graphically represented only when its position is within the displayed content, such as for pan grip control 820, or, in implementations where the entirety of the content is rendered into a memory, such graphical representations may be rendered for the entire content.

Figure 9:
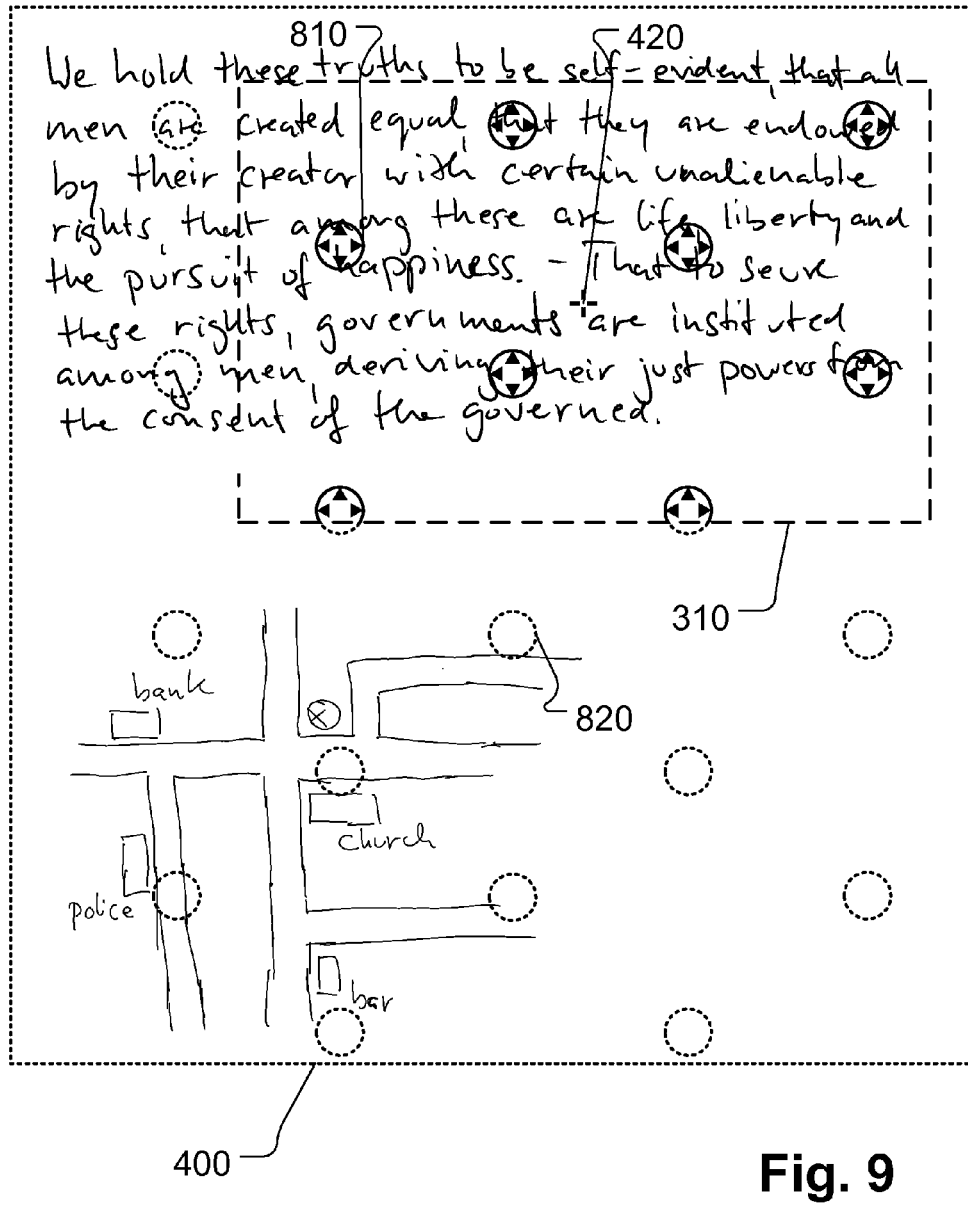
FIG. 9 illustrates a translated rectangular viewport on content with pan grip controls.

In FIG. 9 the rectangular viewport 310 has been translated to a new position relative to the content, upwards and to the right of its position in FIG. 8. The process of translation may be handled by system GUI or windowing libraries, application-independent frameworks or by the application itself. An example for an application-independent framework would be Trolltech's OT® library. A different portion of the content 400 is displayed. The pan grip controls that currently have a position with the viewport, such as 810, are graphically represented. Pan grips, such as 820, that had a position within the viewport before the translation of the viewport relative to the content, but now fall outside of it, are now no longer graphically represented. The pan grip controls such as 810 and 820 have kept their positions relative to the content.

Figure 10:
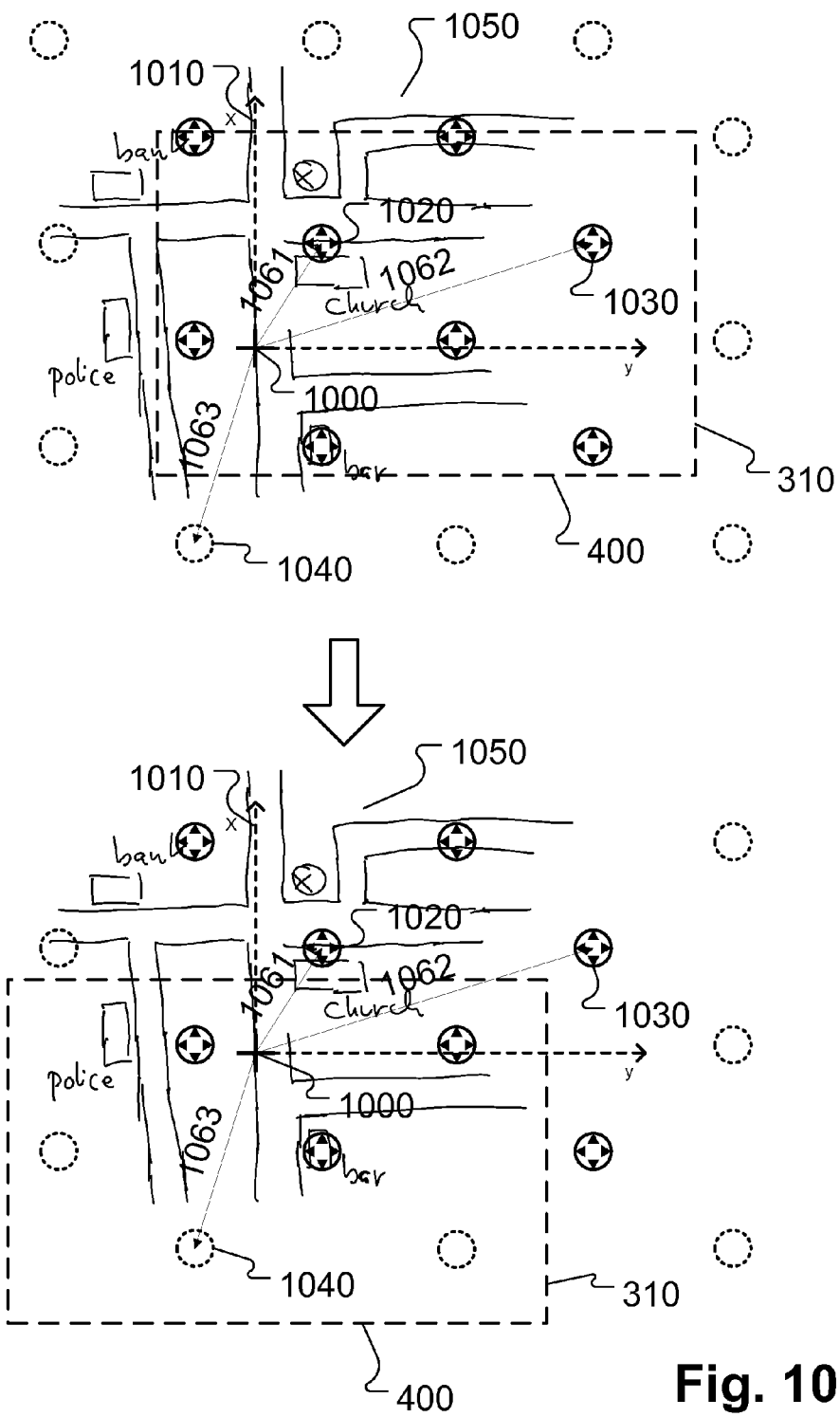
Fig. 10 illustrates a rectangular viewport on content with pan grip controls, which is translated.

FIG. 10 illustrates a viewport 310 on content 1050, with pan grip controls such as 1020, 1030 and 1040. From the first to the second view the viewport 310 has been translated downwards and to the left. The pan grip controls retain their positions in a coordinate system 1010 originating at a point 1000 that is part of the content 1050 as displayed in the viewport, as shown by the vectors 1061, 1062 and 1063. It will be appreciated that point 1000 has been arbitrarily chosen, and that the pan grip controls retain their positions relative to any other point of the content during and after translation of the viewport.

Figure 11:
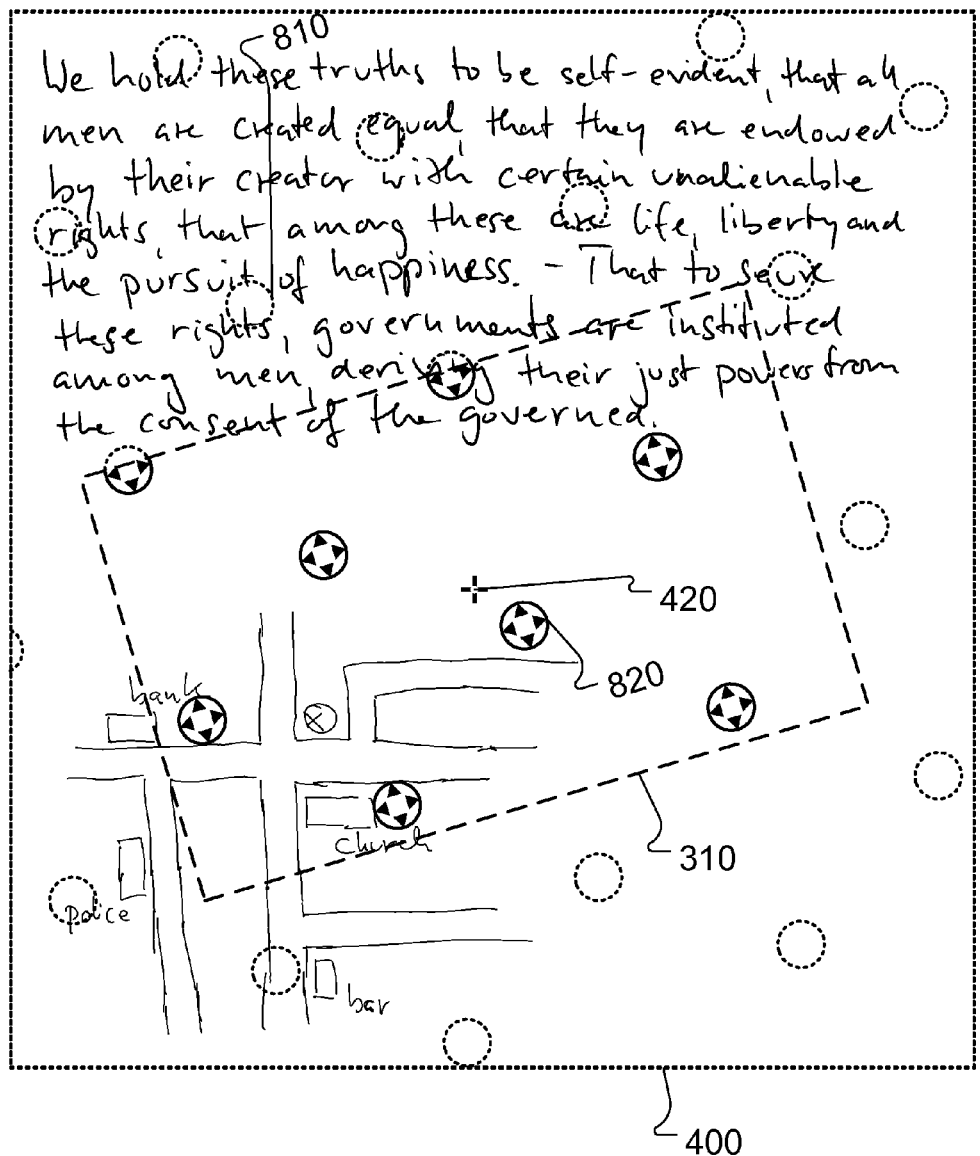
FIG. 11 illustrates a rotated rectangular viewport on content with pan grip controls.

In FIG. 11 the rectangular viewport 310 has been rotated around a central point 1100. The pan grip controls, such as 810, 820, have kept their positions relative to the viewport. The positions of the pan grip controls relative to the content 400 have changed.

Figure 12:
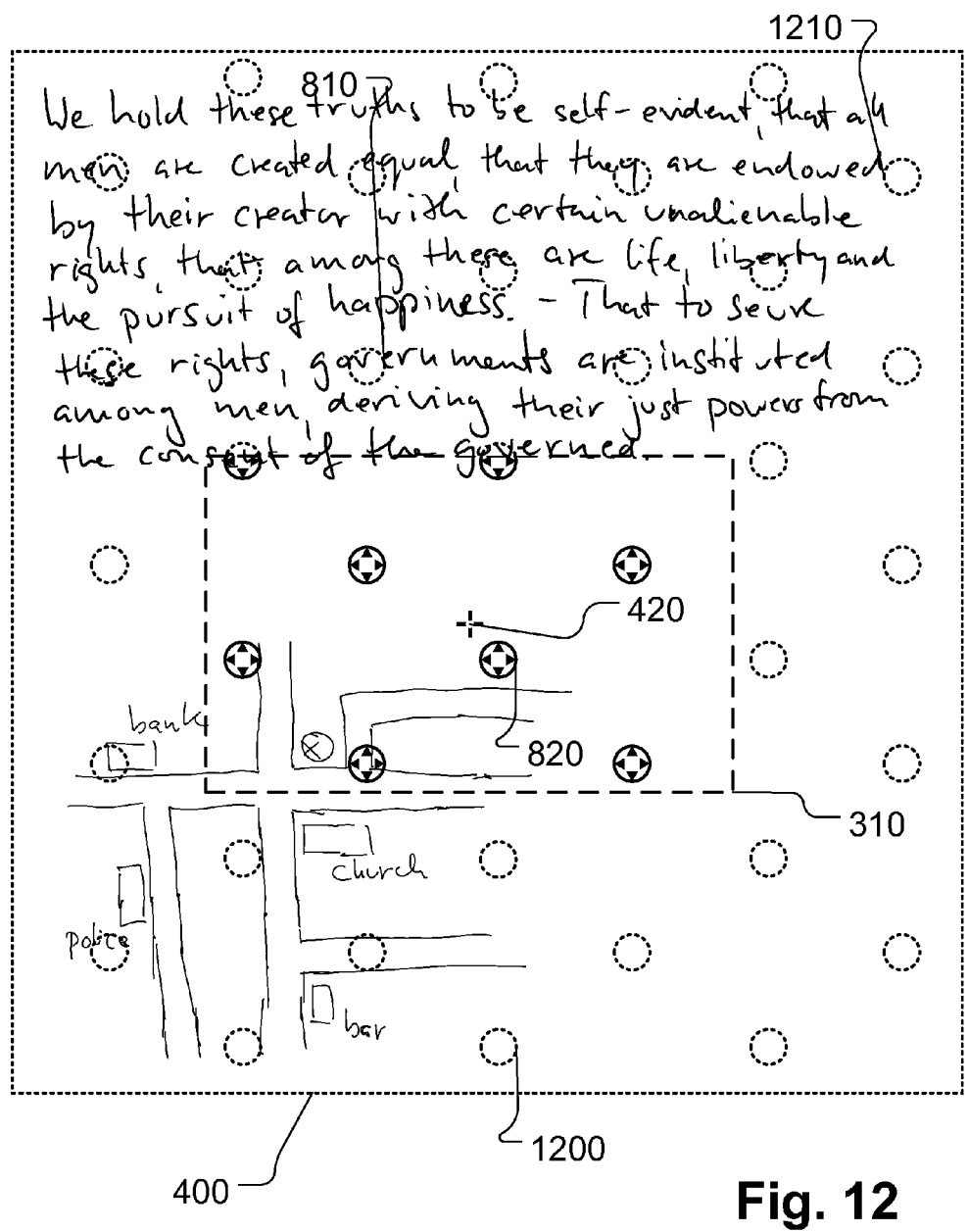
FIG. 12 illustrates a scaled rectangular viewport on content with pan grip controls.

FIG. 12 illustrates a scaled rectangular viewport 310. The viewport has been scaled relative to a center point 420, so that the displayed content appears to be zoomed. The pan grip controls, such as 810, 820, have kept their positions and size relative to the viewport. Their positions relative to the content 400 have changed. The position of additional pan grip controls such as 1200, 1210 relative to the content has been determined.

It will be appreciated that while in the described embodiments of pan grip controls the pan grip controls may retain their positions and size relative to the viewport during rotation and scaling of the viewport, other implementations are possible. For example, the pan grip controls may retain their positions relative to the content during rotation. The pan grip controls may retain their positions relative to the content during scaling. During scaling, the pan grip controls may retain their size relative to the viewport. Additional pan grip controls may be added in between the positions of present pan grip controls when zooming in and pan grip controls may be removed when zooming out.

Geometric Arrangement of Pan Grip Controls

Figure 13:
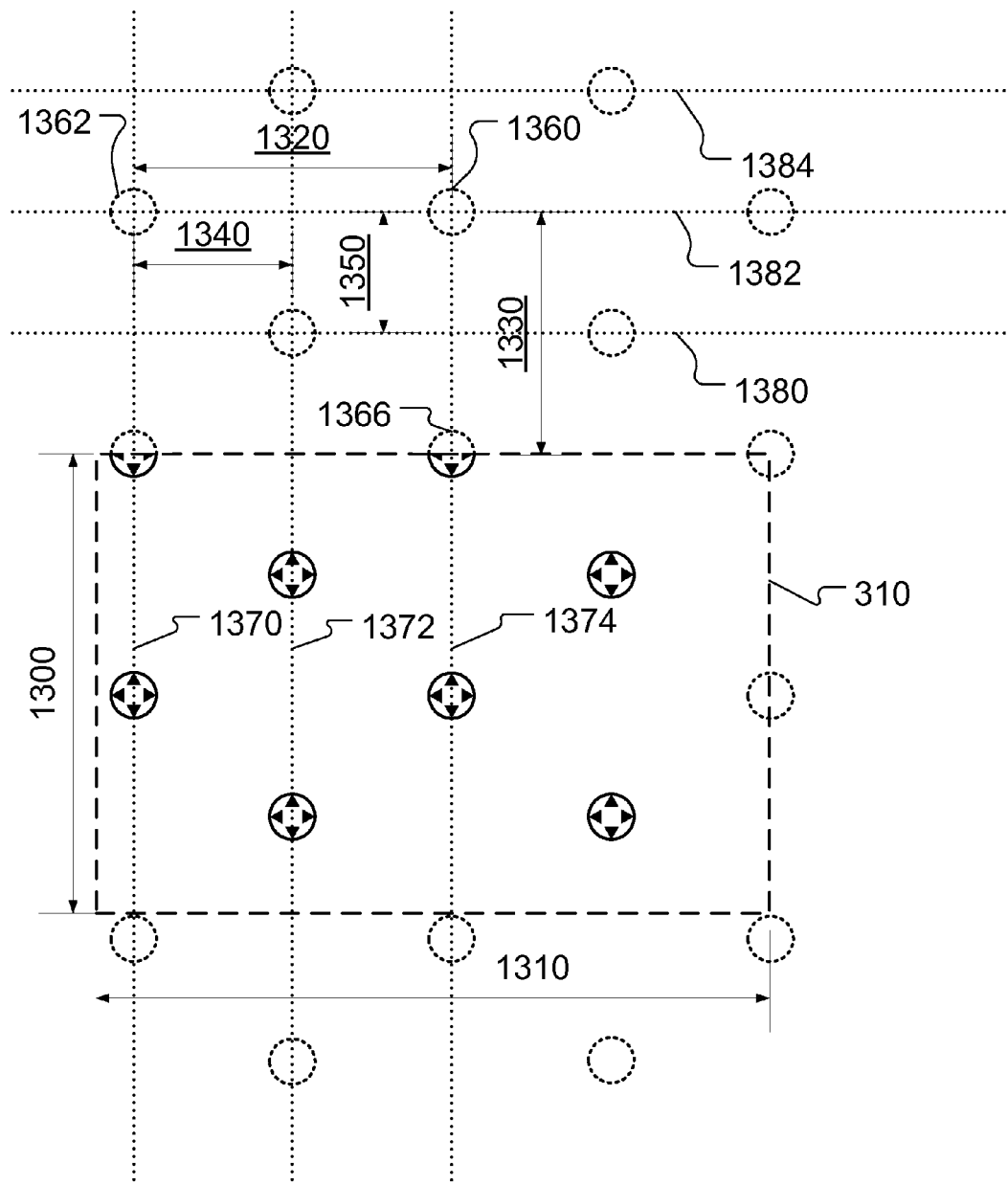
FIG. 13 illustrates a geometry for a pattern of pan grip controls.

FIG. 13 illustrates a geometrical arrangement of pan grip controls in an embodiment of pan grip controls. Here, the pan grip controls such as 1360, 1362, are arranged at alternate intersections of a grid formed by vertical lines such as 1370, 1372, 1374 and horizontal lines such as 1380, 1382, 1384.

The grid has a vertical spacing 1350 and a horizontal spacing 1340. Adjacent pan grip controls in each direction such as 1360 and 1362 horizontally, and 1360 and 1366 vertically, have a spacing of twice the line spacing, 1330 vertically and 1320 horizontally. In this case the spacings have been chosen in relation to the vertical extent 1300 and the horizontal extent 1310 of the rectangular viewport so that at least two pan grip controls in the horizontal direction and one pan grip control in the vertical direction for each line always fall within the rectangular viewport 310.

Figure 14:
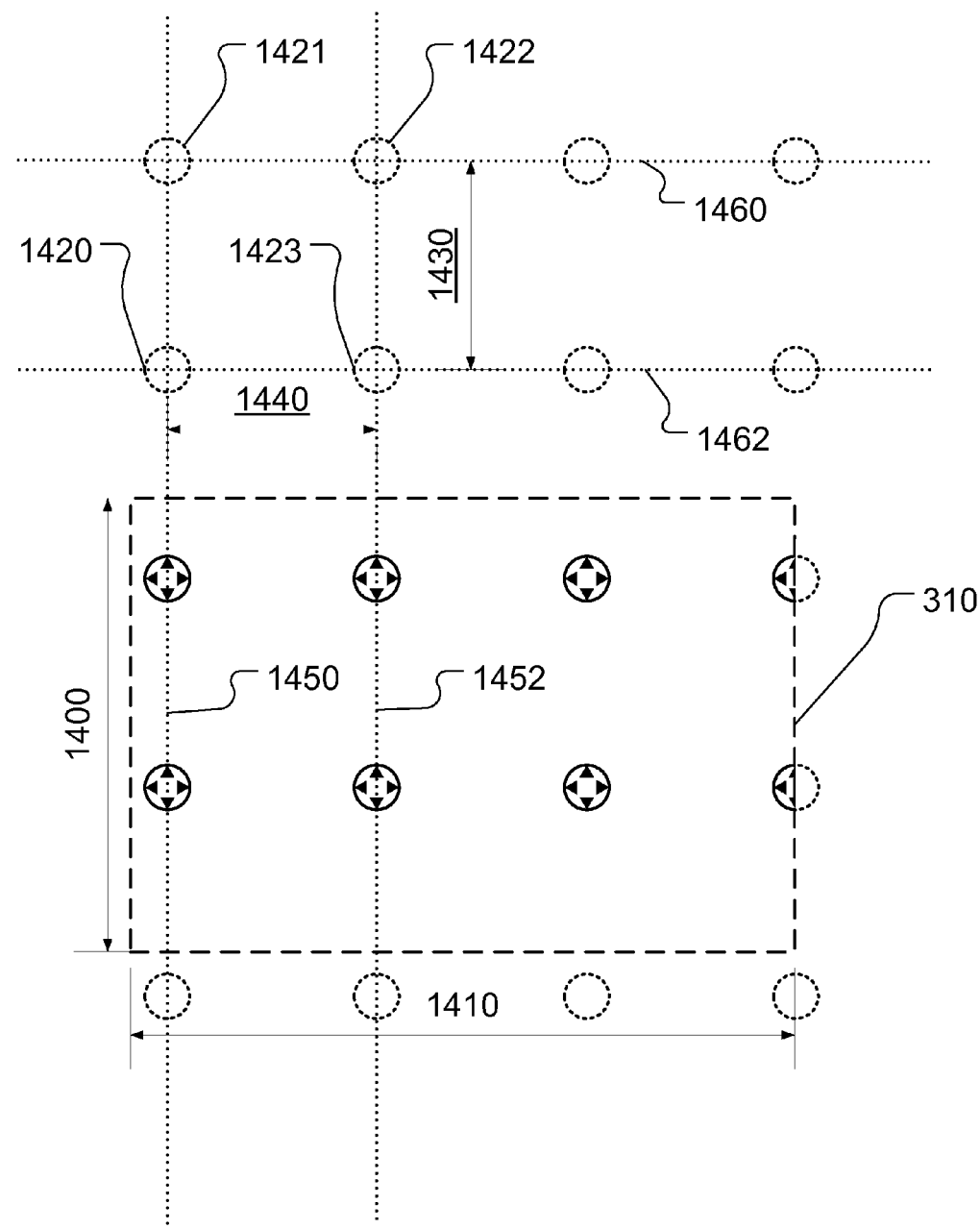
FIG. 14 illustrates a geometry for a pattern of pan grip controls.

FIG. 14 illustrates the geometrical arrangement of pan grip controls in another embodiment of pan grip controls. The grid of the horizontal lines, such as 1460, 1462, and the vertical lines, such as 1450, 1452, has equal spacings 1430, 1440 in both the vertical and the horizontal direction. The pan grip controls such as 1420, 1421 and 1422 are placed at all intersections of the lines. As shown, the spacing between the lines may be chosen as a function of the size of the rectangular viewport 310. Here the spacing is less than one half of that of the lesser of the two extents 1400 and 1410 of the viewport, i.e. less than half of the height 1400 of the rectangular viewport 310.

It will be appreciated however, that both the horizontal and the vertical spacing may be a function of the viewport width and height respectively. The spacing of the pan grip controls may adjust dynamically to changes in the viewport size. Thus a change in the viewport size, e.g. when the user resizes a window in a windowing environment, and thus changes the size of a viewport, may lead to a recalculation of the spacings of the grid. The positions of the pan grip controls are recalculated employing the chosen method for the calculation of their positions and with the new grid spacings. This adjustment may be limited to a certain range of values for the spacings of pan grip controls, e.g. to ensure that the placement of the pan grip controls remains useable on a certain implementation and device.

If the spacings are adjusted solely in relation to a viewport size, then in enlarged viewports the distance between pan grip controls may increase to a point where the increased pointer travel necessary to operate a pan grip control can slow down the use of the pan grip controls, while a reduction of the viewport size can lead to the pan grip controls being very close together, which may obscure a significant portion of the content and leave little room for non-panning interaction with the displayed content. Here the spacings may be restricted so that the distance between two pan grip controls does not exceed a maximum distance and does not go below a minimum distance.

It will also be appreciated that arrangements of the pan grip controls that are not based on a regular grid may be implemented. Such patterns might be, but are not limited to, the pan grip controls arranged in a diamond pattern, at the corners of a hexagon, or any pattern that is based on a geometric shape or has some other regularity, i.e. where the arrangement of positions of pan grip controls repeats.

It will be further appreciated that the placement of pan grip controls may be dependent on or influenced by the displayed content, e.g. pan grip controls could be placed so that certain portions or elements of content are not overlain by them.

Figure 15:
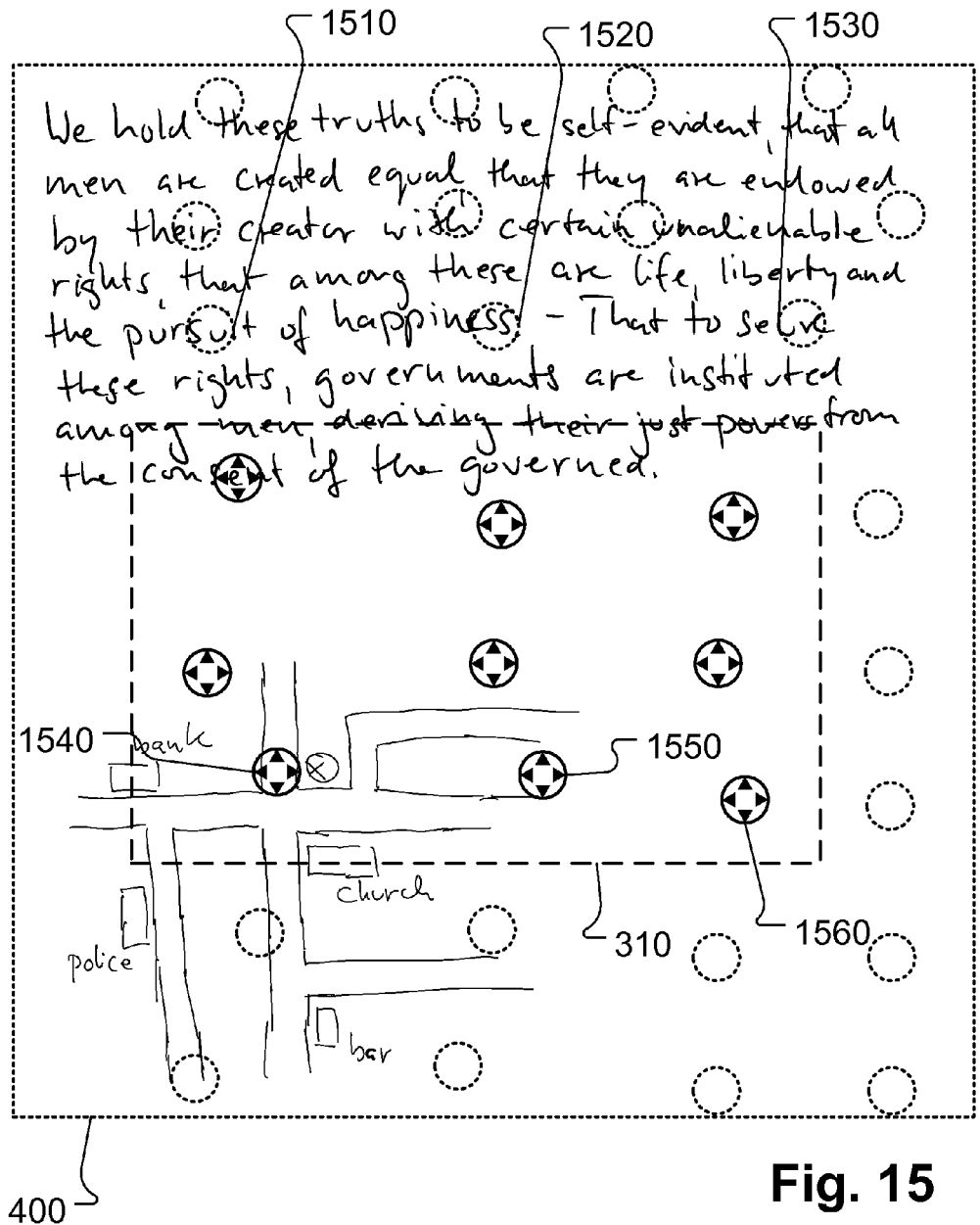
FIG. 15 illustrates a arrangement of pan grip controls.

FIG. 15 illustrates a positioning of the pan grip zones influenced by the displayed content. FIG. 15 shows content 400 with a viewport 310 and pan grip controls such as 1510 and 1550. The basic pattern of the pan grip controls here is a grid of four columns with eight rows. The actual positioning does not adhere strictly to that grid, but is influenced by the content. Pan grip 1510 is placed so that it does not overlap with any of the surrounding words. Where this is not possible, such a with pan grip 1520, placement may be so that the overlap is minimized. In cases where a certain threshold of overlap may be exceeded, a pan grip may be omitted entirely, as is the case between pan grips 1520 and 1530, where one pan grip in the row is missing. If the displacement to accommodate the content is quite substantial, such as with pan grip 1540, neighboring pan grips, such as pan grips 1550 and 1560 may be displaced as well without there being a necessity based on the content underlying their positions. This may be done to improve the number of available pan grips in the viewport.

Placement of Pan Grip Controls

Various methods for determining the initial positions of pan grip controls for a displayed content may be employed.

Figure 16:
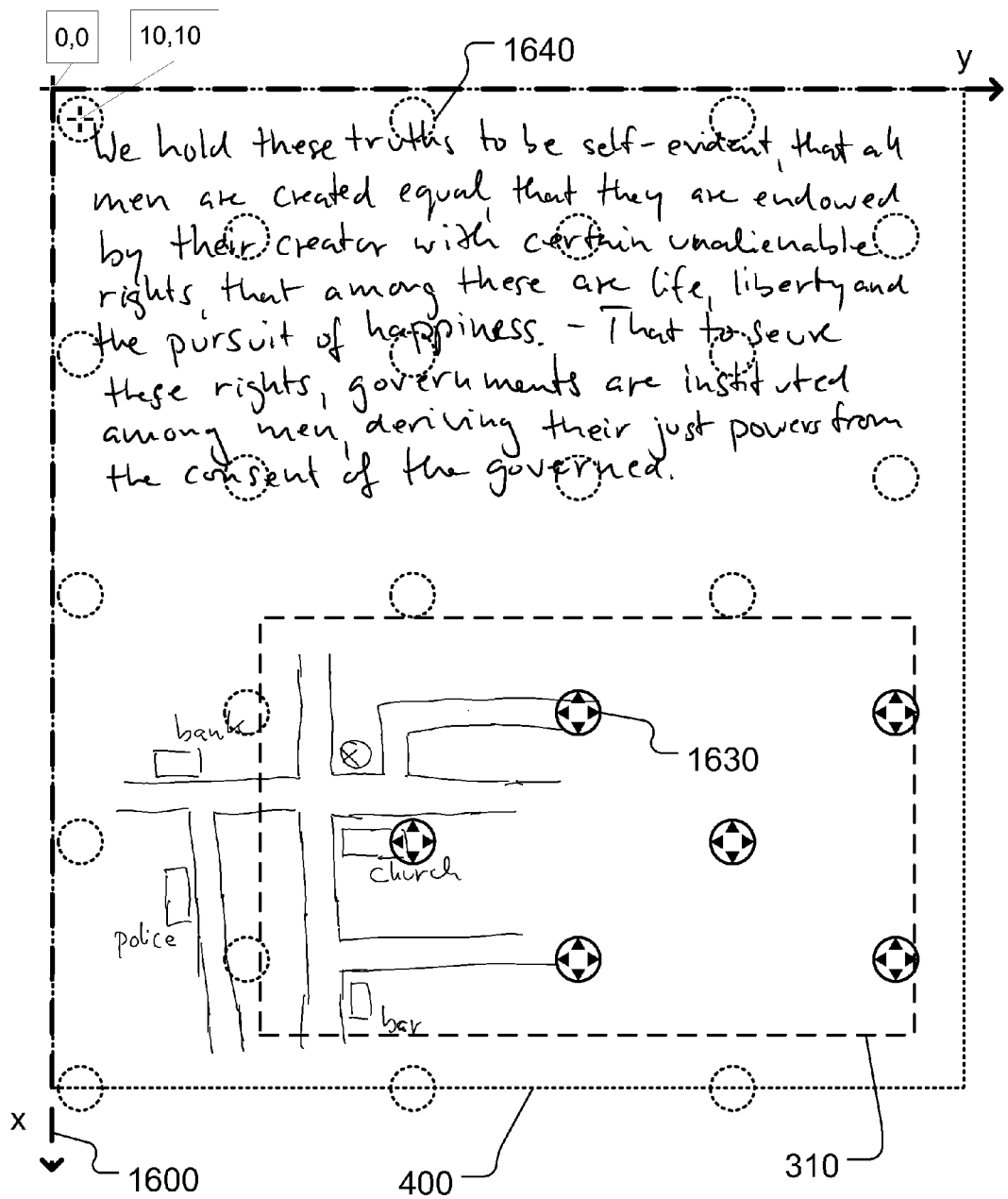
FIG. 16 illustrates a determination of the positions of pan grip controls.

FIG. 16 illustrates an initial determination of the positions of the pan grip controls relative to a content 400. A point in the content is chosen as the origin point of a coordinate system 1600 in which the positions of the pan grip controls are initially determined. The content as shown here has already been mapped to the viewport coordinate system, and these coordinates are used for the initial determination of the positions of the pan grip controls. Here the origin point 1610 is in the upper left corner of content 400. It will be appreciated, however, that any other point within the content may be chosen. The position of a first pan grip control 1620 is determined in this coordinate system, and is here set at a value of 10,10. It will be appreciated, however, that any other point in the content may be chosen. The positions of the other pan grip controls are determined relative to this first pan grip control 1620, and are determined using a chosen pattern or arrangement for the placement of the pan grip controls. Here a pattern similar to the one illustrated in FIG. 13 is used. It will be appreciated that any other pattern or arrangement may be used.

Figure 17:
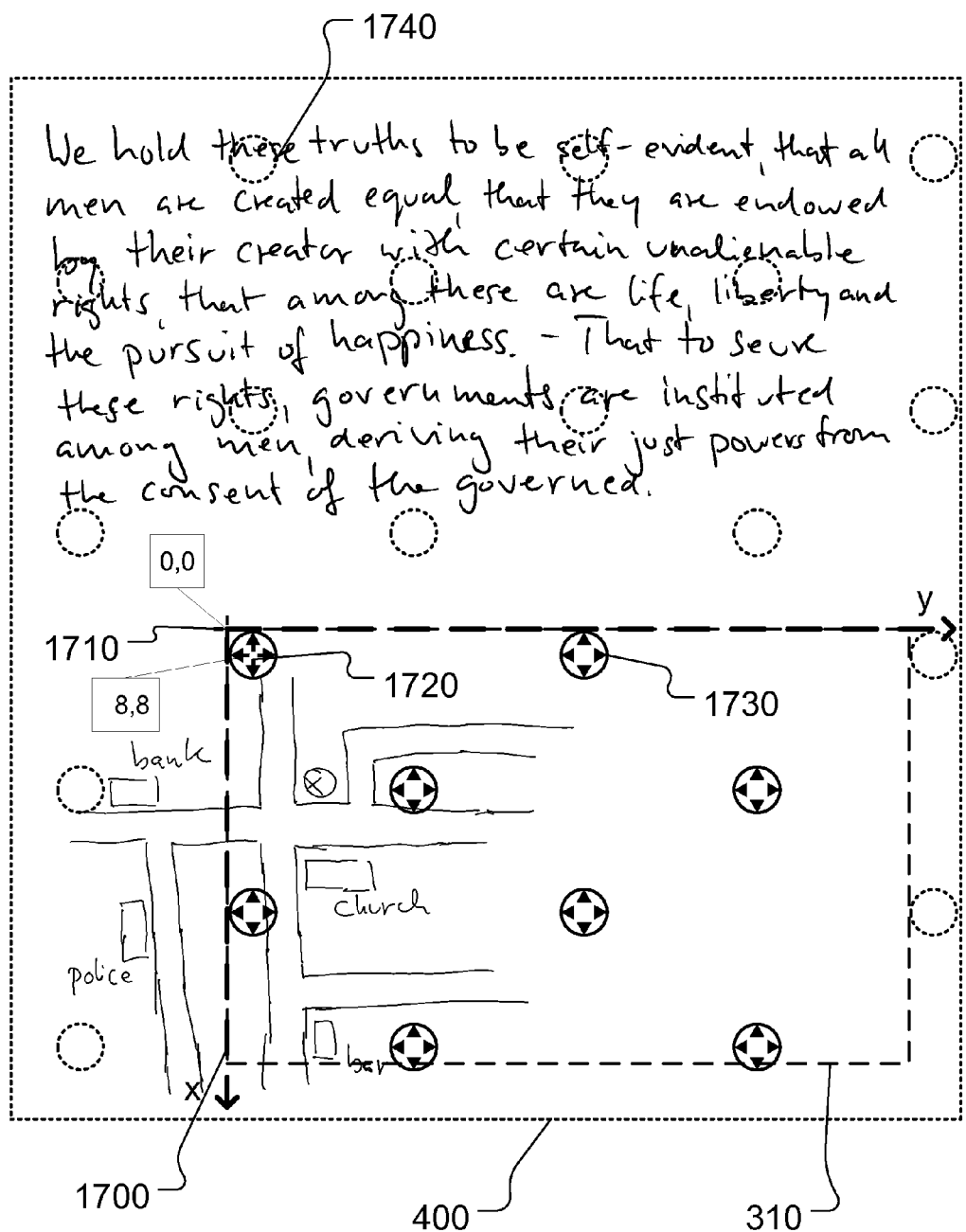
FIG. 17 illustrates a determination of the positions of pan grip controls.

FIG. 17 illustrates an initial determination of the positions of the pan grip controls relative to a viewport. A point in the viewport is chosen as the origin point of a coordinate system 1700 in which the positions of the pan grip controls are initially determined. Here this point 1710 is the upper left corner of viewport 310. It will be appreciated that any other point within the viewport may be chosen. The position of a first pan grip control 1720 is determined in this coordinate system, and is here set at a value of 8,8. It will be appreciated, however, that any other point within the viewport may be chosen. The positions of the other pan grip controls are determined relative to this first pan grip control 1720, and are determined using a chosen pattern for the placement of the pan grip controls. Here a pattern similar to the one illustrated in FIG. 13 is used. It will be appreciated that any other pattern or arrangement may be used.

While the pan grip controls retain their positions relative to the content after panning (i.e. translation) of the viewport, a new determination of the positions of the pan grip controls may follow a scaling or rotation of the viewport.

Active Zone and Graphical Representation

The pan grip controls are active zones in the viewport receptive to pointer input and may have a graphical representation. Panning input on a pan grip control initiates, controls or otherwise affects panning. Such panning input may be a pan initiation input or a pan control input. The active zones may be of any shape, size or position. The choice of these characteristics may be dependent on the specifics of an implementation, such as, but not limited to, the kind or kinds of pointing device used for pointer input, the size of the display and/or the viewport or the size and shape of the graphical representation of the pan grip control. For example, it may be expedient to have larger active zones for an implementation where pointer input is received via a finger-operated touch screen versus an implementation where pointer input is received via a stylus-operated touch screen. The size of the active zones may remain constant for a wide range of screen sizes. In implementations on devices with small screens, however, a trade-off between the ideal size of the active zones for e.g. finger operation and preserving space outside of the active zones for non-panning interaction with the displayed content may lead to a reduction of the size of the active zones. The size and positioning of the active zones may coincide with that of the active zones, since these may serve to indicate the active zones to the user, but the active zones may e.g. be bigger than the graphical representation to allow for easy operation, while the size of the graphical representation may be kept to a minimum in order to obscure as little of the displayed content as possible.

The graphical representation of the pan grip controls may similarly be of any shape, size and position. In an embodiment, the shape, size and position of the graphical representation of the pan grip controls may be substantially identical to that of the active zones.

Considerations in the graphic design of the graphical representation of the pan grip controls may be, but are not limited to, keeping the graphical representation visually distinct from the displayed content, to obscure as little of the content as possible, to conform to the overall design of the program that pan grip controls form a part of or to conform to the interface guidelines and/or theme of an operating system that pan grip controls are being implemented on. The graphic design of the graphical representations may be dynamic, e.g. it may adjust to the color or other aspects of the displayed content or to a usage state or context within the program that pan grip controls form a part of.

In an embodiment the color or colors of the graphical representation of pan grip controls may be chosen or adjusted to ensure a chosen contrast against the displayed content. An adjustment of the color or colors of the graphical representations of pan grip controls may be global, i.e. for all pan grip controls, or on a per-pan grip control basis, e.g. the graphical representation of a pan grip control that overlies a light-colored part of the displayed content may be of a darker color while one that overlies a darker part of the same displayed content may be of a lighter color. In an embodiment the transparency of the graphical representation of individual pan grip controls may be dependent on the underlying displayed content, e.g. the graphical representation of a pan grip control that is overlying a part of the displayed content where only the background may be displayed more opaque while the graphical display of a pan grip control that is overlying e.g. text that is part of the displayed content may be displayed with a higher degree of transparency, so that the underlying text may be visible.

With a watermarking effect that may be used in an embodiment, the graphical representations of pan grip controls are displayed through changes in the color of parts of the displayed content, e.g. with a uni-color part of displayed content at the position of a pan grip control, the graphical display may be in e.g. one or more darker shades of the color of the displayed content, while with a part of the displayed content that has multiple colors, a darker shade or darker shades of each of these colors may be used to render the graphical display of the pan grip control.

FIGS. 18-24 illustrate several possible embodiments for the graphical representations of the pan grip controls and the active zones of the pan grip controls.

Figure 18:
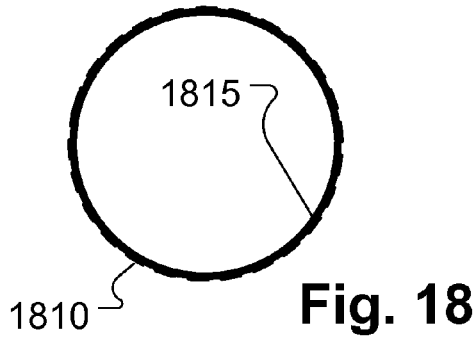
FIG. 18 illustrates the active zone and graphical representation of a pan grip control.

FIG. 18 is an illustration of a pan grip control with a graphical representation in the form of a circle 1810. The active zone 1815 has a circular shape with a radius equal to that of 1810, and with the same center point.

Figure 19:
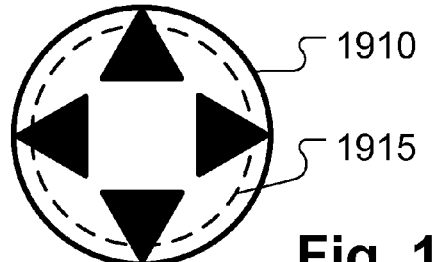
FIG. 19 illustrates the active zone and graphical representation of a pan grip control.

In FIG. 19 the graphical representation 1910 is a continuous, round graphical element, with its background alpha-blended to display the underlying content. With alpha blending a translucent foreground color is combined with the colors of the overlain content, thereby producing blended colors. In FIG. 19 the foreground color may be set to complete transparency or to a highly transparent setting. The active zone 1915 is circular like the graphical representation 1910, but of a smaller radius.

Figure 20:
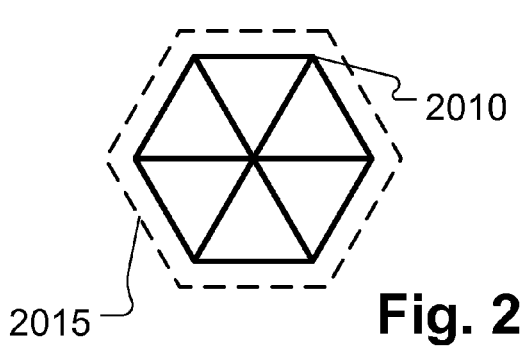
FIG. 20 illustrates the active zone and graphical representation of a pan grip control.

In FIG. 20 the graphical representation 2010 is a continuous graphical element in the shape of a hexagon. The active zone 2015 has a similar shape but is larger in size than the graphical representation 2010.

Figure 21:
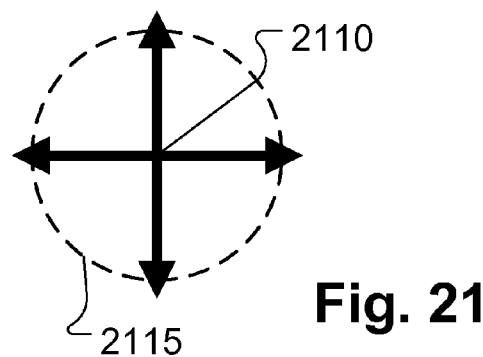
FIG. 21 illustrates the active zone and graphical representation of a pan grip control.

FIG. 21 illustrates an example where the shape of the active zone 2115 does not follow that of the graphical representation 2110. The graphical representation 2110 here consists of two overlapping lines with arrow heads at their ends. The active zone 2115 has a circular shape with a diameter almost equal to the length of the lines that make up the graphical representation, and its center at the intersection of the two lines that make up the graphical representation.

Figure 22:
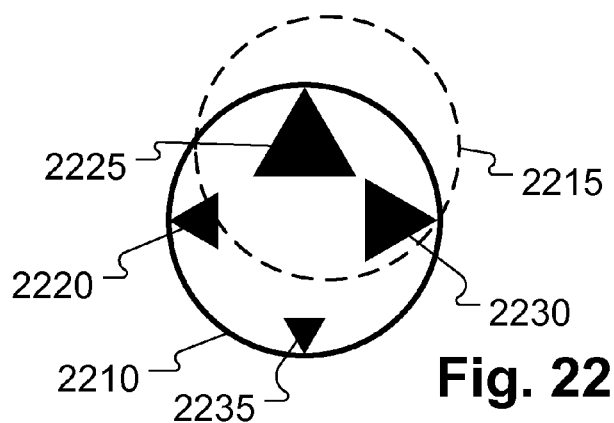
FIG. 22 illustrates the active zone and graphical representation of a pan grip control.

FIG. 22 illustrates a graphical representation 2210 and an active zone 2215 that are both round and of equal size, but where the active zone 2215 is offset to the top and to the right of the graphical representation 2210. Such an offset may be useful, e.g., when a specific implementation leads to the user touching objects at a perceived different position, e.g. in a kiosk system with a large distance between the screen and the touch layer and where the screen is viewed at an angle.

Figure 23:
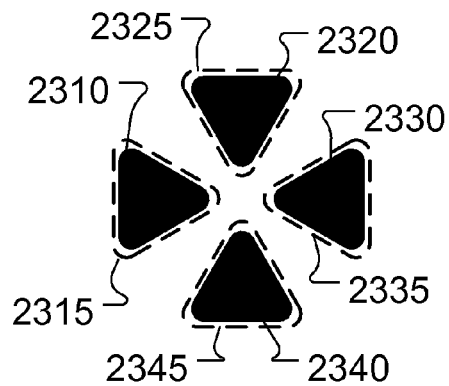
FIG. 23 illustrates the active zones and a graphical representation of a pan grip control.

In FIG. 23 the graphical representation of the pan grip control consists of four parts, 2310, 2320, 2330 and 2340. There are also four active zones, 2315, 2325, 2335 and 2340, which are of a similar shape to the parts of the graphical representations and are sized and positioned to extend slightly beyond these in every direction.

Figure 24:
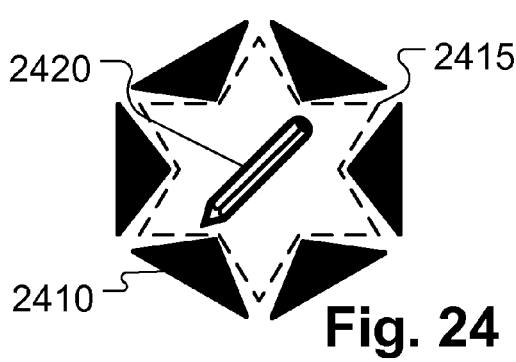
FIG. 24 illustrates the active zone and graphical representation of a pan grip control.

In FIG. 24 the graphical representation of a pan grip control has six parts, such as 2410, which surround the active zone 2415. There is no overlap between the active zone and the graphical representation of the pan grip control.

The graphical representations may be used to provide additional information to the user, such as, but not limited to, a currently selected tool for non-panning interaction with the displayed content, the possible directions and amount of panning, a current usage context or a current program state.

A currently selected tool for non-panning interaction with the displayed content may be one for any of the non-panning interactions with the displayed content that an embodiment enables, such as, but not limited to, a pen tool for freehand inking, a text tool for adding text to the displayed content, a lasso selection tool for selecting parts of the displayed content, an eraser tool to erase previous additions to the displayed content and a highlighting tool to highlight parts of the displayed content. A program state may be, but not limited to, the current saving of the currently displayed document, an availability of a network connection and a low battery state.

An indication of these may be through changes in the graphical design of the graphical representations of the pan grip controls, such as, but not limited to, resizing of all or parts of the graphical representation, color changes, changes in the transparency level of the graphical representation, display as an overlay or as a watermark or the display of additional elements such as icons. The graphical representations of pan grip controls may e.g. blink, i.e. switch or transition between two or more colors or color schemes, to indicate that changes to the current document are saved, that a network connection is being established or active, or that a chosen change to the content is being processed. The blinking may employ different colors or color schemes to indicate different program actions and states. The graphical representations of pan grip controls may be more transparent in a usage context where non-panning interaction with the displayed content that the pan grip control overlies may be easily effected, and more opaque in a usage context where panning may be more easily effected. Icons may be added to the graphical design as part of the design, or overlaying the design, to indicate e.g. the current saving of a document with a blinking representation of a floppy disk or the current selection of an eraser tool with an animated representation of an eraser erasing a line.

In FIG. 24, an icon 2420 representing a pen is displayed overlying the active zone. This indicates the currently selected tool for non-panning interaction with the displayed content.

In FIG. 22, the graphical representation of a pan grip control gives an indication of the amount the viewport can be panned in each of the four directions. This indication is achieved through the resizing of the four triangles 2220, 2225, 2230 and 2235, and the indication is in relative terms. Thus the graphical representation 2210 indicates that the viewport can be panned significantly further upwards than downwards, since the triangle 2235 is significantly smaller than the triangle 2225, and that the viewport can be panned somewhat further to the right than to the left, since the triangle 2230 is only somewhat bigger than the triangle 2220.

Panning Using Pan Grip Controls

Figure 25:
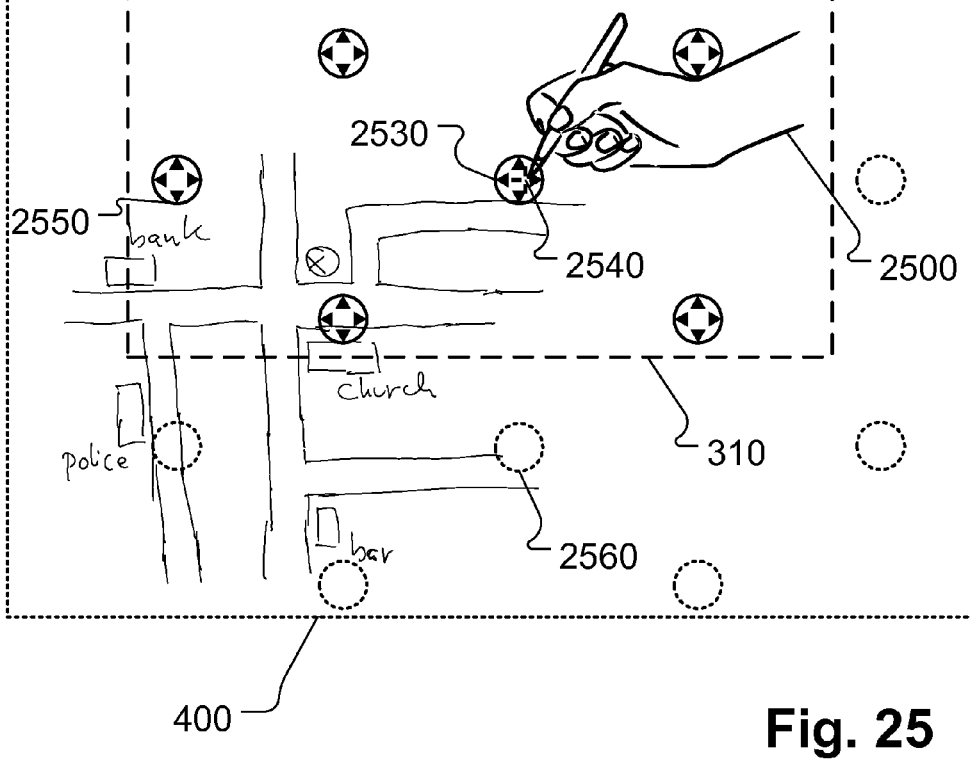
FIG. 25 illustrates the operation of an embodiment of pan grip controls.

Panning using pan grip controls may be initiated by a pan initiation input and controlled by a pan control input. FIG. 25 illustrates the initiation of panning using a pan grip control within a rectangular viewport 310 on content 400. The user input 2500 here is a pointer down event, effected using a stylus on a touch screen, at a point 2540 which is within the active zone of a pan grip control 2530. The active zone of the pan grip control 2530 is here identical in position and size to the graphical representation of the pan grip control.

The user input 2500 is interpreted as a pan initiation input. In an embodiment of pan grip controls, the pan initiation input may be a pointer down event within the active zone of a pan grip control. It will be appreciated, however, that in other embodiments additional aspects or actions as part of the user input may be employed in order for a user input to be interpreted as a pan initiation input. Such aspects or actions may be, but are not limited to, a pointer rest for a preset period of time, such as 0.5 seconds, after the initial pointer down event, a pointer up and a subsequent pointer down within the active zone within a preset period of time after the initial pointer down event, a double tap within the active zone of the pan grip control or a stylus pressure level and/or angle within a certain range on systems equipped to receive such data.

Figure 26:
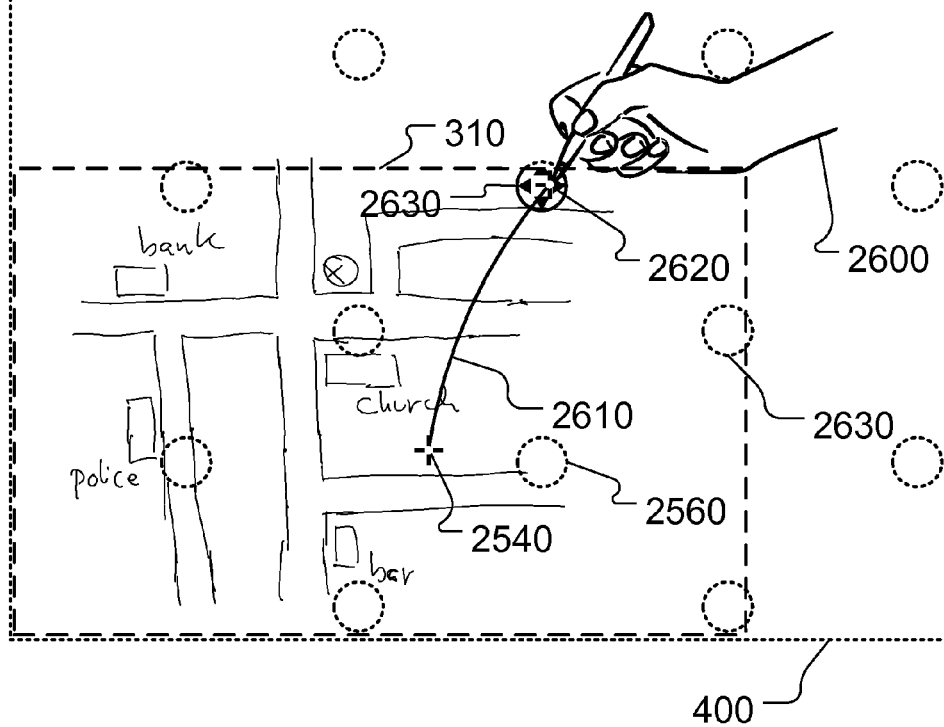
FIG. 26 illustrates the operation of an embodiment of pan grip controls.

In FIG. 26 the rectangular viewport 310 has been translated to a new position, downwards and to the left of its position in FIG. 25. User input 2600, which is a pointer drag on the pan grip control 2530, subsequent to the pan initiation input 2500, from 2540 to 2620 along a path 2610, has been interpreted as a pan control input. In the present embodiment, a pointer drag input that is interpreted as pan control input follows the pan initiation input without any intermediate pointer events such as a pointer up and a pointer down, except for a possible pointer rest. The pointer down event within the active zone of a pan grip control, which is interpreted as the pan initiation input, and the subsequent dragging of said pan grip control form a single, uninterrupted action by the user. It will be appreciated, however, that intermediate pointer events may be possible in other embodiments, such as, but not limited to, a pointer up and subsequent pointer down. In some embodiments, the pan control input may be received on a pan grip control different from the one that received the pan initiation input. Thus the pan imitation input in FIG. 25 may end with a pointer up event, and the pan control input may be a dragging of a different pan grip control such as 2550.

In an embodiment, the pointer movement that is interpreted as a pan control input is translated into an amount of panning equal to the pointer movement in both direction and distance. Consequently both the pan grip control 2530 and the content 400 maintain their position relative to the pointer position. Pan grip controls such as 2560 now have a position within the viewport, but are not currently graphically displayed, since in the present embodiment all the pan grip controls except for the one receiving the pan control input are hidden during panning, including those such as 2630 that were graphically displayed before the panning was initiated.

While the amount of panning may be equal to the pointer movement, other translation factors may be employed, so that a pointer movement may result in a larger or smaller amount of panning. These different translation factors may be employed upon the user selecting a 'slow pan' or a 'fast pan' rate for the panning, or be program controlled. User selection of a translation factor may be through means such as, but not limited to, the use of a separate menu in the main menu structure of the program, an on-screen button in the user interface, a hardware key on the device an embodiment is implemented on, and a prefix gesture to a pan control input. In particular, in an embodiment selection of the translation factor may be through an overlay menu with a slider that is called up through a specific input on a pan grip control, such as a double tap, and which allows for the control of the pan rate across a range of values. For example, for a translation factor of 0.5, the distance panned is half that normally effected by a given pan control input, while e.g. for a translation factor of 2.0 the distance panned is double that of that normally effected by a given pan control input. In these instances the pan grip controls retain their positions relative to the content as displayed in the viewport, and consequently the position of the pan grip control that the pan control input was initiated on diverges from the pointer position while panning.

Figure 27:
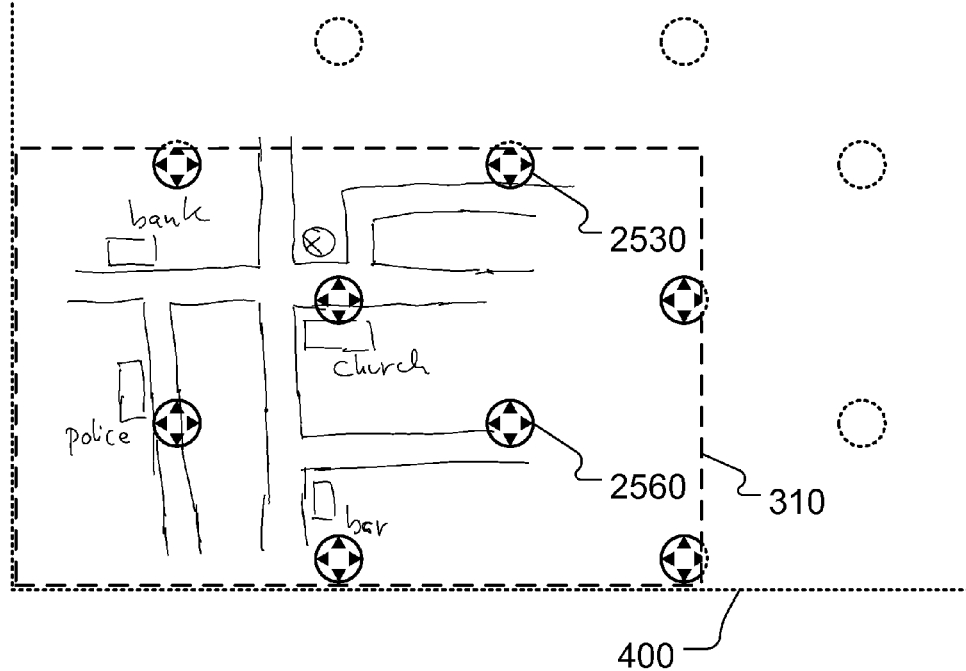
FIG. 27 illustrates the operation of an embodiment of pan grip controls.

FIG. 27 illustrates the viewport and content after the panning has ceased. The user input, and with it the panning, has ceased with a pointer up event at 2620. The viewport is in the same position relative to the content that it was in FIG. 25. The pan grip controls such as 2530 and 2560 are displayed and receptive to user input.

Figure 28:
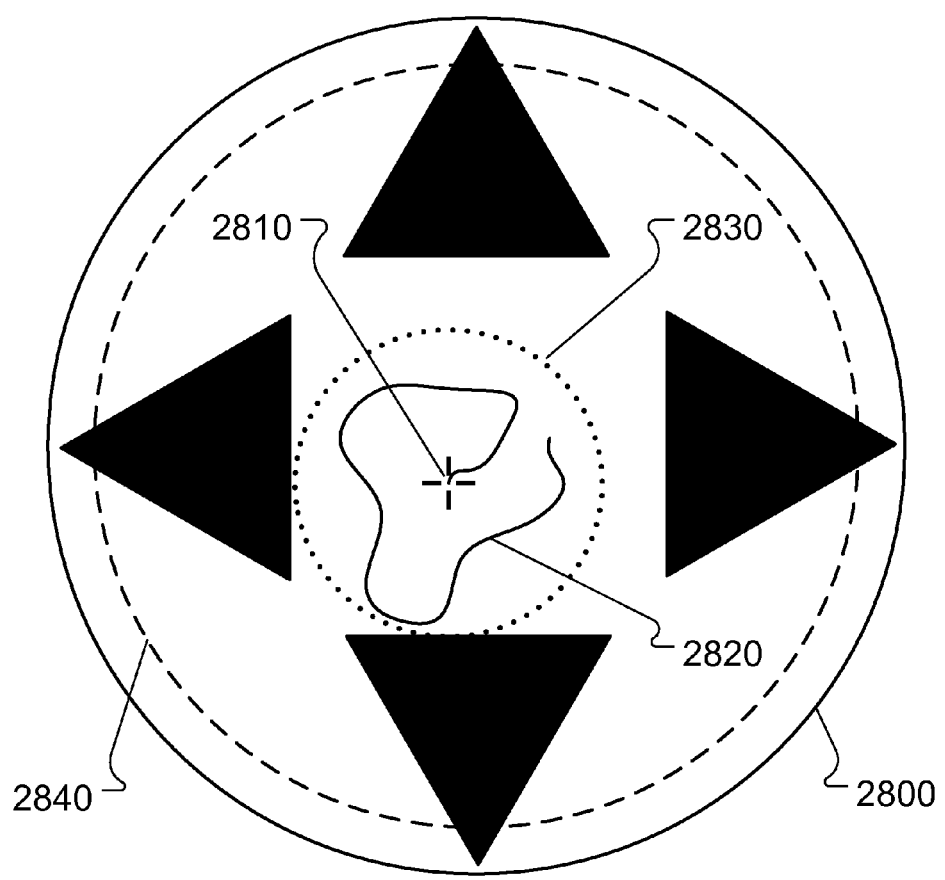
FIG. 28 illustrates a pointer rest.

A pointer rest does not necessarily refer to there being no pointer movement at all. Depending on the pointing device, the system that pan grip controls are implemented on, and other implementation details, a user trying to not move the pointer may still create some pointer input. Such input may be interpreted to be part of a pointer rest. FIG. 28 illustrates one such example. There is an initial pointer down at point 2810 within the active zone 2840 of a pan grip control 2800. Subsequent to this there are pointer events along a path 2820. These may be due to e.g. changes in the pressure of a fingertip on a resistive touch screen that leads to the registration of different contact points, or a slight movement of the tip of a stylus on a touch screen or screen with an active digitizer layer. These pointer events are determined to be part of a pointer rest as long as their distance from the point 2810 of the initial pointer down event as a reference point does not exceed a radius 2830. A radius suitable to distinguish reliably enough between intended pointer movement and pointer events that do not represent an intentional pointer move by the user depends on the details of the implementation, especially on those of the device employed for pointer input. It will be appreciated that while here the reference point is an initial pointer down event, it may alternatively be a pointer position at which a previous pointer drag or other pointer movement has been determined to end.

While the determination of a pointer event being part of a pointer rest is shown as based on distance from an initial pointer down event, other mechanisms may be employed, such as setting a rate of pointer movement that needs to be exceeded, so that a very slow drift of the pointer may still be processed as being part of a pointer rest.

Kinetic Panning

In an embodiment, kinetic panning is implemented.

Kinetic panning may be initiated by a pan control input that ends in a flick, i.e. a pointer input that substantially consists of a straight line and which ends in a pointer up event, characterized by the user effecting it within a very short time period and without interruption.

In kinetic panning, the panning continues after the end of the pan control input. The direction and initial rate of continued panning may be equal to the direction and speed of the panning at the end of the pan control input, i.e. the flick. The rate of panning then decreases over time. The overall effect of this to the user is that he has imparted the content with kinetic energy which keeps it moving, and that this energy is reduced due to friction. Implementations of kinetic panning can be found on many modern platforms, e.g. IPHONE® OS, ANDROID® or some implementations of SYMBIAN® S60 5$^{th}$ edition.

During kinetic panning the entire viewport may accept additional user input in the form of flicks that control the direction and rate of kinetic panning. The direction and speed of the flick are added to the current 'impulse' vector of the kinetic panning. Thus e.g. a flick in the current direction of the kinetic panning increases the rate of panning, while a flick that is at a 180 degree angle to the current direction of the kinetic panning reduces the rate of panning, or even stops or reverses it if the negative rate added equals or exceeds the current rate.

Kinetic panning stops once the rate of panning has decreased to zero or below a threshold minimum value, or due to a pointer down event anywhere in the viewport that is not part of a flick, i.e. that is not the beginning of a pointer input that substantially consists of a straight line and which ends in a pointer up event, characterized by the user quickly effecting it.

In an embodiment, the pan grip controls are hidden during kinetic panning.

The hiding of a pan grip control results both in a cessation of the display of its graphical representation and in its active zone or zones not being receptive to user input. User input within the active zone is interpreted as non-panning interaction with the displayed content.

Figure 29:
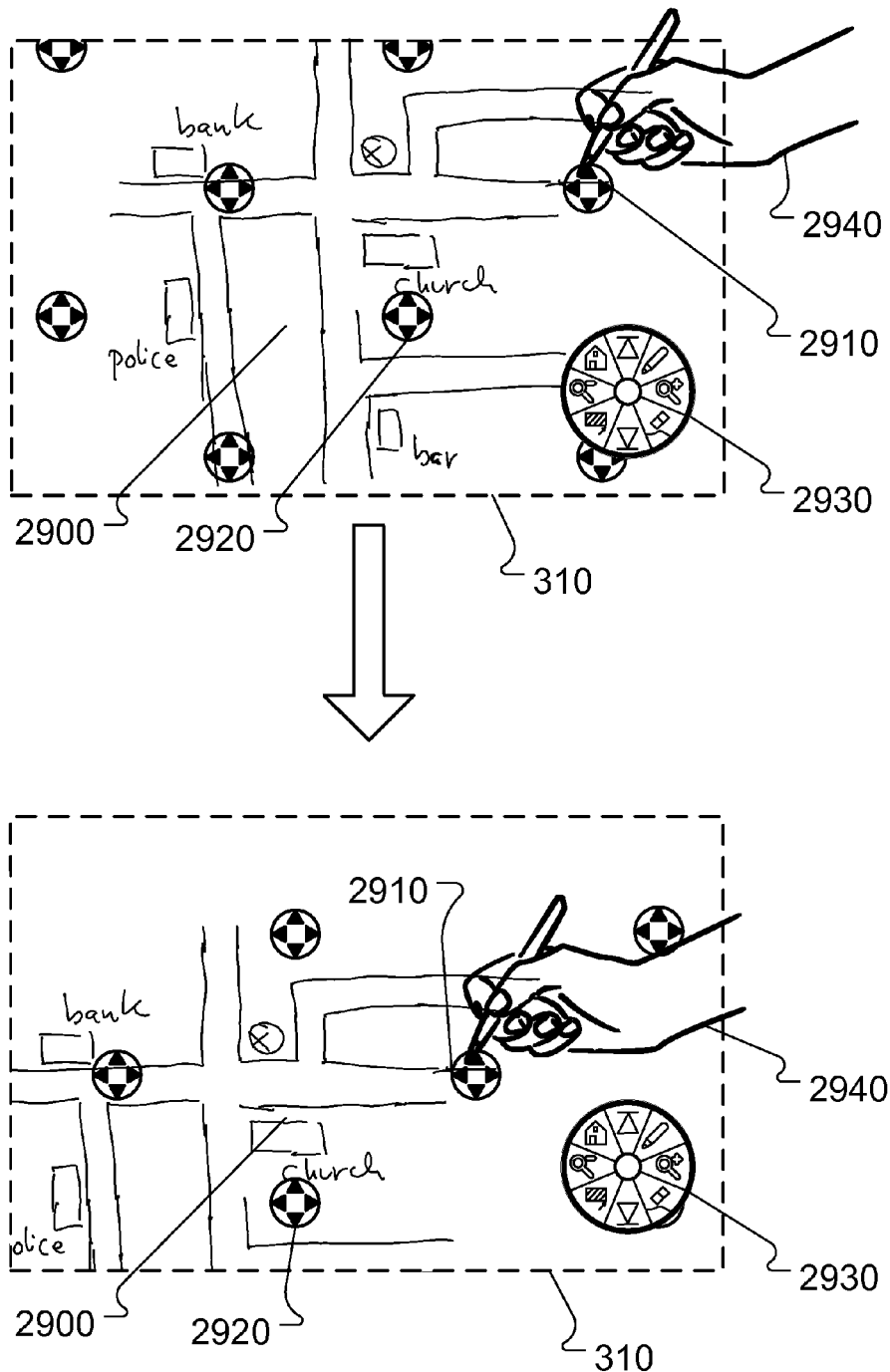
FIG. 29 illustrates a rectangular viewport with a UI overlay element.

FIG. 29 illustrates a rectangular viewport 310 with a displayed content 2900 and overlying pan grip controls such as 2910, 2920. Additionally a user interface overlay 2930 in the form of a graphical representation of a pie menu is displayed. In the first view, a user input 2940, starting in pan grip control 2910, initiates panning. In the second view, the viewport has been panned. The pan grip controls have maintained their positions relative to the content as displayed in the viewport. The pan control input has only affected the panning of the viewport on the displayed content. Overlays over the viewport, such as the user interface overlay 2930, but also other overlays such as, but not limited to, system messages or system or program dialog boxes, are not part of the displayed content and are thus not affected by the panning. The position of the user interface overlay 2930 has not been altered.

Pan grip controls may be implemented as part of an application. Implementations as part of an application may use system services and libraries or application-independent frameworks (such as TrolltechQT®) for panning, graphical overlays and other aspects of pan grip controls.

In an embodiment, pan grip controls may be implemented as an operating system service on an operating system such as MICROSOFT® WINDOWS® 7, or as part of an application-independent framework, such as Trolltech OT®, and offered for applications to use. This may allow for the background of a viewport to be set to a pan grip controls layer in the same way that the background is set to a particular color. A background with pan grip controls in the form of watermarks that are visible through the displayed content is then provided by the application-independent framework or the operating system. Input on the pan grip controls is processed by the operation system service or the application-independent framework, while input outside of the pan grip controls is processed by the application. Pan control received via the pan grip controls is delivered to the application in the form of panning events or messages. In this case there need be no special adaptation of the application to the use of pan grip controls. The function of the pan grip controls layer may be limited to the dragging of pan grip controls as the pan control input, without secondary functions accessible through the pan grip controls, and without the possibility for non-panning interaction with the displayed content in places occupied by the pan grip controls.

Non-Panning Interaction with the Displayed Content

Figure 30:
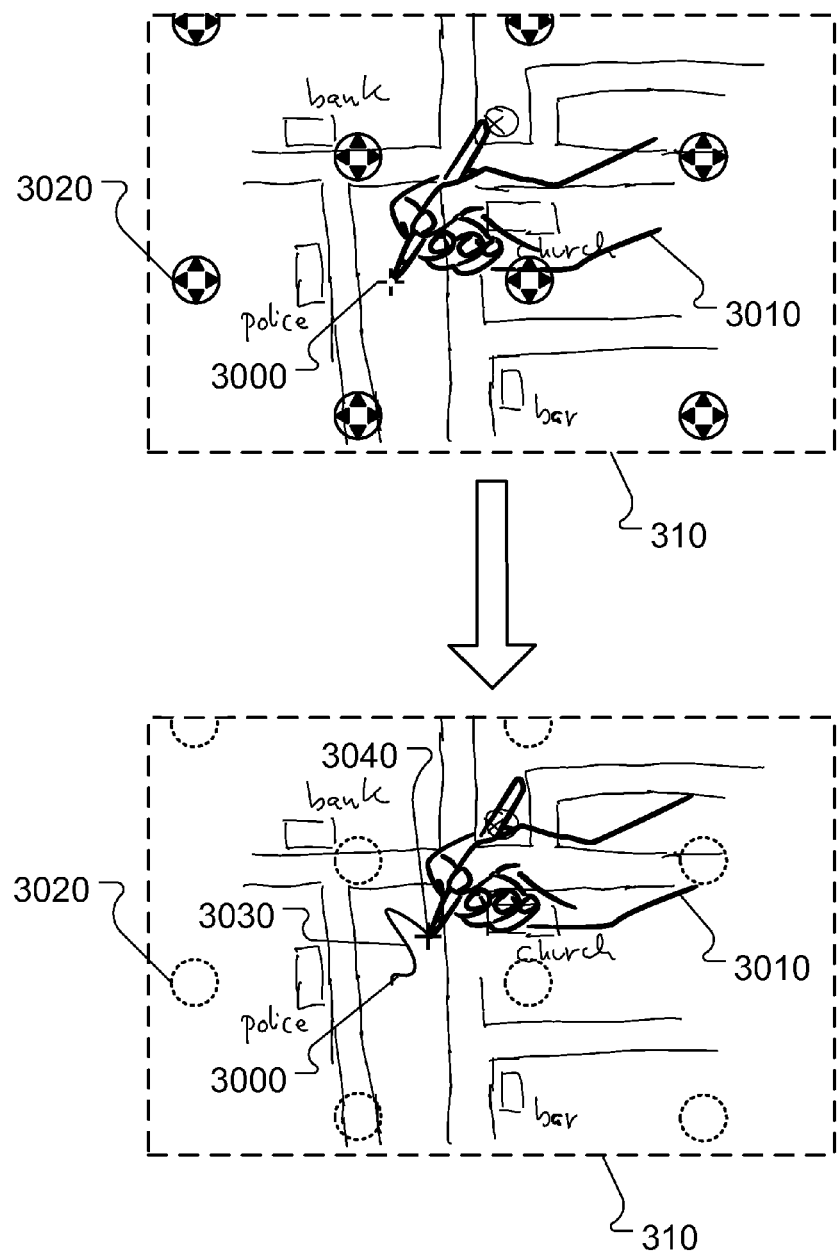
FIG. 30 illustrates non-panning interaction with the displayed content.

FIG. 30 illustrates non-panning user interaction with the displayed content at positions outside of the pan grip controls. The first view illustrates the start of user input 3010, which is a pointer down event at a position 3000 outside of pan grip controls such as 3020.

In the second view of FIG. 30, the user input 3010 has continued along a path 3030 in the shape of a wavy line that presently ends at point 3040. Since in this instance the currently selected tool for non-panning interaction with the displayed content is a freehand drawing tool, this wavy line is rendered as part of the displayed content. The pan grip controls such as 3020 are hidden while this non-panning interaction with the displayed content continues.

A currently selected tool for non-panning interaction with the displayed content may be one for any of the non-panning interactions with the displayed content that an embodiment enables, such as, but not limited to, a pen tool for freehand inking, a text tool for adding text to the displayed content, a lasso selection tool for selecting parts of the displayed content, an eraser tool to erase previous additions to the displayed content and a highlighting tool to highlight parts of the displayed content.

Selection of tools may be through any mechanism suitable for a particular implementation, such as, but not limited to, hierarchical menus with a central menu bar, tool bars, keyboard hotkeys, pointer gestures and pop-up menus.

The choice of a tool may influence the operation of pan grip controls. For example, while a drawing tool is selected a pointer down event within the active zone of a pan grip control and a subsequent pointer move may be interpreted as non-panning interaction with the displayed content, i.e. drawing on the displayed content, with the pan initiation input requiring additional distinguishing elements such as a pointer rest following the pointer down. As long as a selection tool is selected a pointer down event within the active zone of a pan grip control and a subsequent pointer move may be interpreted as a pan initiation and a pan control input, while non-panning interaction with the displayed content underlying a pan grip control, i.e. the initiation of selection on a pan grip control, may require additional distinguishing elements such as a pointer rest following the pointer down. This difference in the operation of the pan grip controls depending on the chosen tool may be indicated to the user through changes in the graphical representation of the pan grip controls.

In an embodiment, the pan grip controls remain hidden for a predetermined period of time, such as a period of one second, after the non-panning interaction with the displayed content has stopped. This allows continuous user interaction with the displayed content, e.g. the user lifting a stylus at the end of a written word and starting to write the next word without having to worry about causing panning if the input falls within the active zone of a pan grip control.

While here a freehand drawing tool is illustrated, it will be appreciated that non-panning interaction with the displayed content is in no way limited to this. The specific non-panning interactions possible may be determined by the nature of the displayed content, the program displaying the content, a current mode of the program regarding non-panning interaction with the displayed content, the specific nature of the user input or other factors. Non-panning interactions that may be implemented may be, but are not limited to, digital inking, inputting text, creating a graphical object, adding a hyperlink, adding media or making other additions to the displayed content, highlighting a part of the displayed content, tagging a part of the displayed content, selecting an object in the displayed content, cutting and copying from the displayed content, pasting an object into the displayed content, erasing or moving an element of the displayed content, altering the appearance of a part of the displayed content, such as bold-facing text, interacting with an active element in the displayed content, such as but not limited to hyperlinks, media objects and graphical objects, or rotating or scaling the displayed content.

While the viewport outside of the pan grip controls is generally receptive to non-panning user interaction with the displayed content, such non-panning interaction with the displayed content may also be the result of input that is received on a pan grip control.

Figure 31:
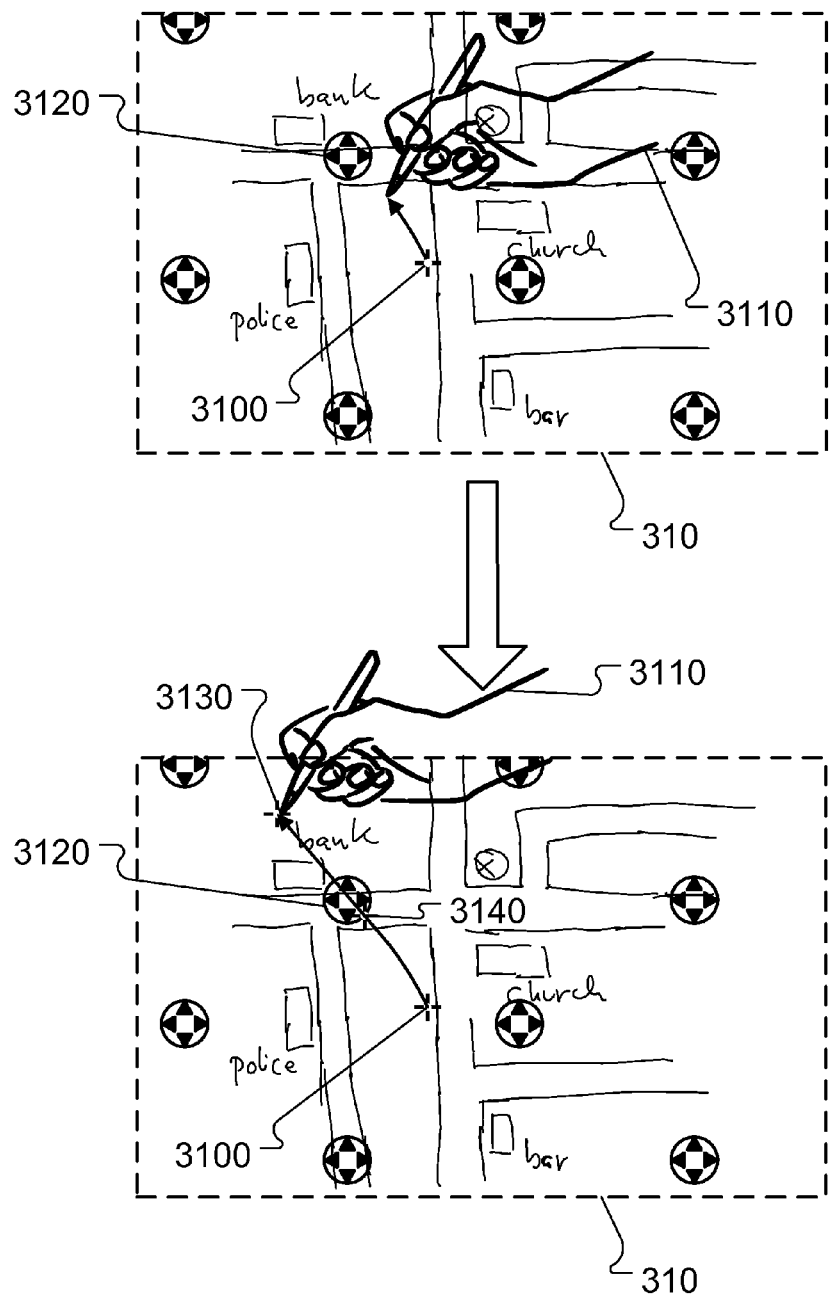
FIG. 31 illustrates non-panning interaction with the displayed content.

In FIG. 31, the user input 3110 within the rectangular viewport 310, which has started at point 3100, and is here effected using a stylus, is a line that in the first view moves in the direction of pan grip control 3120.

In the second view, the user input 3110 has traversed pan grip control 3120 and extended further to a point 3130. The user input 3110 entered the active zone of pan grip control 3120 at point 3140. This initial pointer event within the active zone, as well as the subsequent pointer events within the active zone of pan grip control 3120 as part of user input 3110, are not interpreted as a panning input. The traversal does not result in any panning. The pointer events within the active zone of the pan grip control 3120 are interpreted as part of the entirety of user input 3110, which is a non-panning interaction with the displayed content. In FIG. 31 the user input 3110 is illustrated as a freehand drawing that is rendered as a line as part of the displayed content, but it may be any other non-panning interaction with the displayed content.

Figure 32:
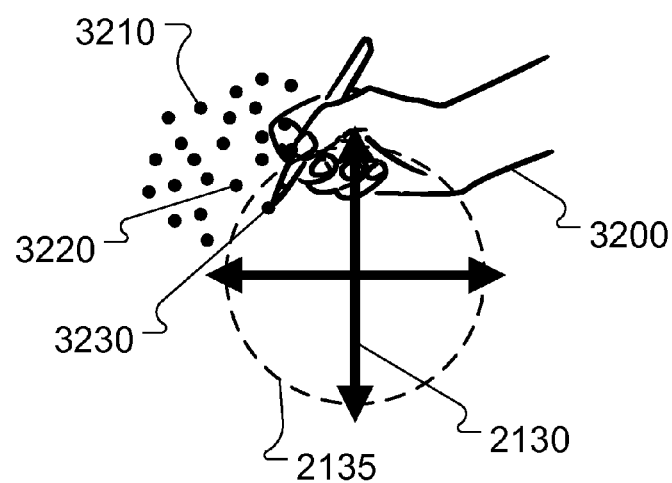
FIG. 32 illustrates non-panning interaction with the displayed content.

FIG. 32 illustrates another instance in which user input within the active zone of a pan grip control is interpreted as a non-panning input that results in non-panning interaction with the displayed content. Here the pan grip control has an active zone 1935 and a graphical representation 1930. A pen tool is currently selected for non-panning interaction with the displayed content. The user has added a whole series of dots such as 3210 and 3220 to the displayed content by a quick series of taps, i.e. a pointer down event followed by a pointer up event without any intermediate pointer events, at positions such as 3210 and 3220. User input 3200, which is a tap at 3230, is effected immediately subsequent to the previous taps, i.e. without any intermediate pointer events and within a short period of time. While here, unlike in the situation illustrated in FIG. 31, the user input 3200 is separated by a pointer up event from previous user taps, it is nonetheless determined to be connected to this input due to its similarities regarding its timing, position and nature. The user input 3200 is interpreted as a non-panning interaction with the displayed content and a dot is added at 3230.

In the examples illustrated by FIGS. 31 and 32, the characteristic of the input on a pan grip control that is interpreted as a non-panning input interacting with the displayed content is its connection to an input outside of the pan grip controls, or more generally to a larger context of the input.

In an embodiment, an input on a pan grip control may be interpreted as a non-panning input due to characteristics inherent in the input itself. Such characteristics may be, but are not limited to, a pointer rest for a preset period of time, e.g. one second, after the initial pointer down event, a pointer up and a subsequent pointer down within the active zone within a preset period of time, a double tap within the active zone of the pan grip control or a stylus pressure and/or angle within a certain range on systems equipped to receive such data.

Which characteristics are adopted for determining whether an input is a panning or a non-panning input may depend on whether panning is the primary form of interaction in regard to the viewport and the displayed content in a particular implementation of pan grip controls or in a particular usage situation.

If panning is a primary form of interaction, e.g. when a document is browsed and few annotations will be made, then it may be preferable if the user may effect panning input quickly and easily, e.g. the pan initiation input may be a simple pointer down event in the active zone of a pan grip control. Here, non-panning input then may have the more complex characteristics, such as an additional pointer rest following a pointer down.

Conversely, if panning is a secondary form of interaction, e.g. when a document is being edited, then the panning input may have more complex characteristics, while the non-panning input may be the simpler input.

Figure 33:
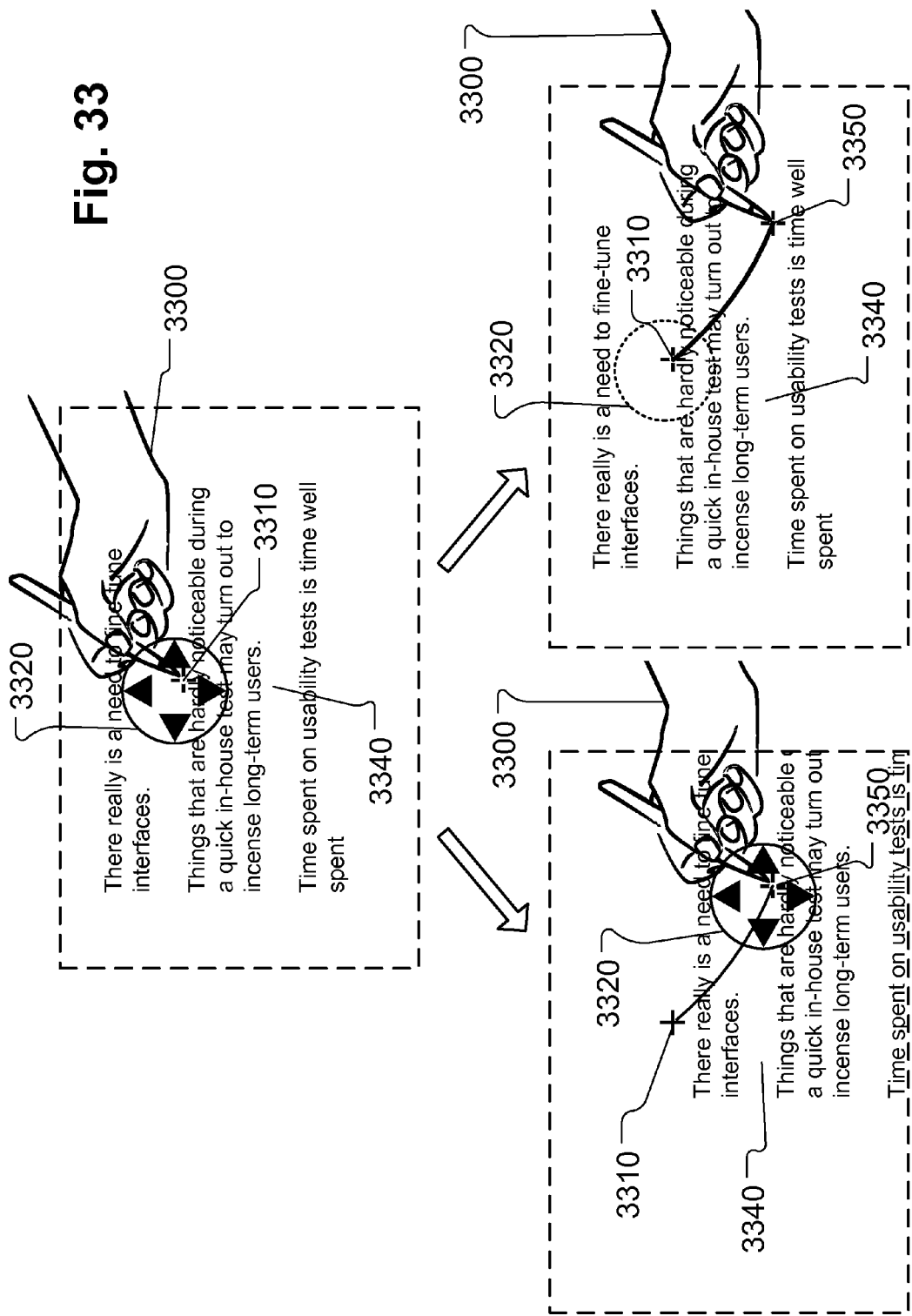
FIG. 33 illustrates non-panning interaction with the displayed content.

In FIG. 33, two different interpretations on an input 3300 are shown. The input 3300 starts in the top view at a position 3310 inside a pan grip control 3320.

In the lower left view the user input 3300 is determined to be a panning input, and the dragging of the pointer from 3310 to 3350 has resulted in a panning of the viewport 310.

In the lower right view, the same user input 3300 is determined not to be a panning input. The pan grip control 3320 is hidden, and the user input 3300 interacts with the displayed content. The user input 3300, which includes a moving of the pointer from 3310 to 3350, here effects the rendering of a line as part of the displayed content along the path of the pointer drag, since a freehand drawing tool is presently selected for non-panning interaction with the displayed content.

While drawing onto the displayed content is shown in FIG. 33, it will be appreciated that the interaction may be any kind of non-panning interaction with the displayed content.

Figure 34:
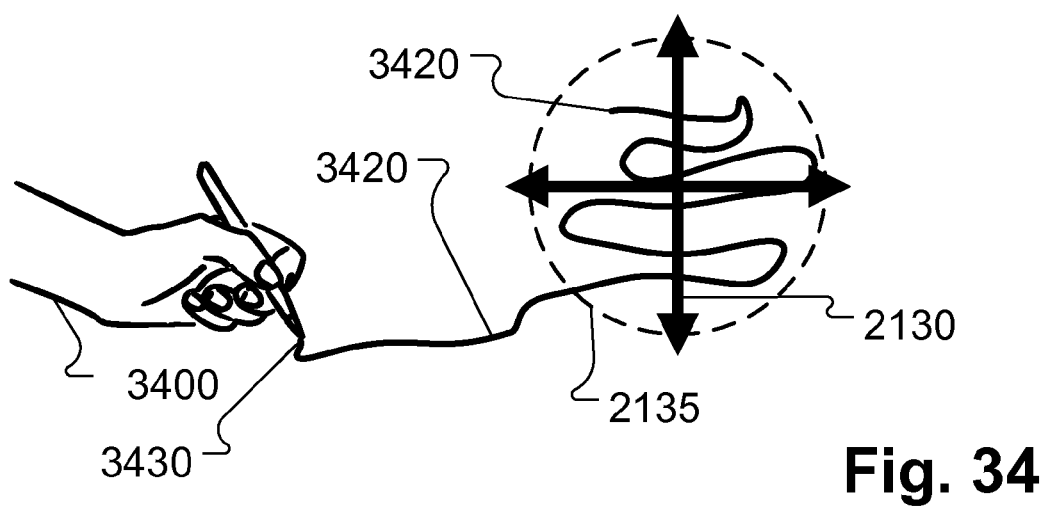
FIG. 34 illustrates non-panning interaction with the displayed content.

FIG. 34 illustrates another instance in which an input on a pan grip control is determined not to be a panning input. The user input 3400 starts with a pointer down event at 3420 within the active zone 1935 of a pan grip control. It continues rapidly with a pointer drag along a path 3410. In an embodiment or state of an embodiment where panning is the primary mode of interaction, this normally results in a panning of the viewport along path 3410. Due to the characteristics of the path 3410 it has been determined that input 3400 is not a panning input, and the input has been interpreted as a non-panning interaction with the displayed content. Since a freehand drawing tool is presently selected for non-panning interaction with the displayed content the path 3410 has been rendered into the displayed content as a line.

In the example input 3400, the characteristics that led to the determination that input 3400 is not a panning input are the frequent reversals of direction of the path 3410 after only a short distance of pointer movement in each direction, which would be highly unlikely characteristics for a panning input. It will be appreciated, however, that other characteristics of pointer input that are found to be inconsistent with regular panning input may be used in this determination, such as a pointer movement that would result in no or a very small net distance of panning, e.g. when the pointer movement is a circle, or a pointer input that has a pressure or angle exceeding normal parameters for such input. The parameters for the latter determination may be dependent on characteristics of previous input by a user.

In the examples illustrated in FIGS. 31, 32 and 34 the input that has been determined not to be a panning input is interpreted in its entirety as a non-panning input that interacts with the displayed content, i.e. as if the entire input had been effected on the displayed content without the pan grip control being there.

Another mechanism that may be implemented to allow non-panning interaction with the displayed content underlying a pan grip control is to have a pan grip control suspend input.

In FIG. 33, the user input 3300 in the first view may be determined to be a pan grip control suspend input. In an embodiment or state of an embodiment of pan grip controls where panning is the primary mode of interaction, this may be, e.g., a pointer down event within the active zone of a pan grip control 3320 followed by a pointer rest.

Upon determination of user input 3300 as a pan grip control suspend input, the pan grip control 3320 that the input is received on is hidden. Subsequent user input in the active zone of the suspended pan grip control is then interpreted as non-panning interaction with the displayed content 3340. With a freehand drawing tool presently selected for non-panning interaction with the displayed content 3340, a pointer drag from point 3310 to 3350 then effects the rendering of a line between the two points.

The cessation of the suspension of the single pan grip control 3320 that received the pan grip control suspension input may then be contingent on the same conditions as those for the cessation of hiding of pan grip controls during non-panning interaction with the displayed content outside of the pan grip controls, e.g. the hiding of the pan grip control may end a preset time period after interaction has ended.

A mechanism where certain inputs on a pan grip control that have been determined not to be a panning input are interpreted in their entirety as non-panning input that interacts with the displayed content, and a mechanism for a pan grip control suspend, where only input subsequent to the suspension is interpreted as non-panning input that interacts with the displayed content, may be implemented in the same embodiment of pan grip controls.

The mechanisms used to determine whether an input on a pan grip control is a panning input or non-panning input that interacts with the displayed content may also be used to determine additional kinds of input that control other functions and modes.

This may be, but is not limited to, panning the viewport so that the pan grip control the input is received on is centered within the viewport, switching to a different scaling level of the viewport, invoking an on-screen control element for scaling the viewport and switching the translation factor for panning.

Flow of a Preferred Embodiment

Figure 36:
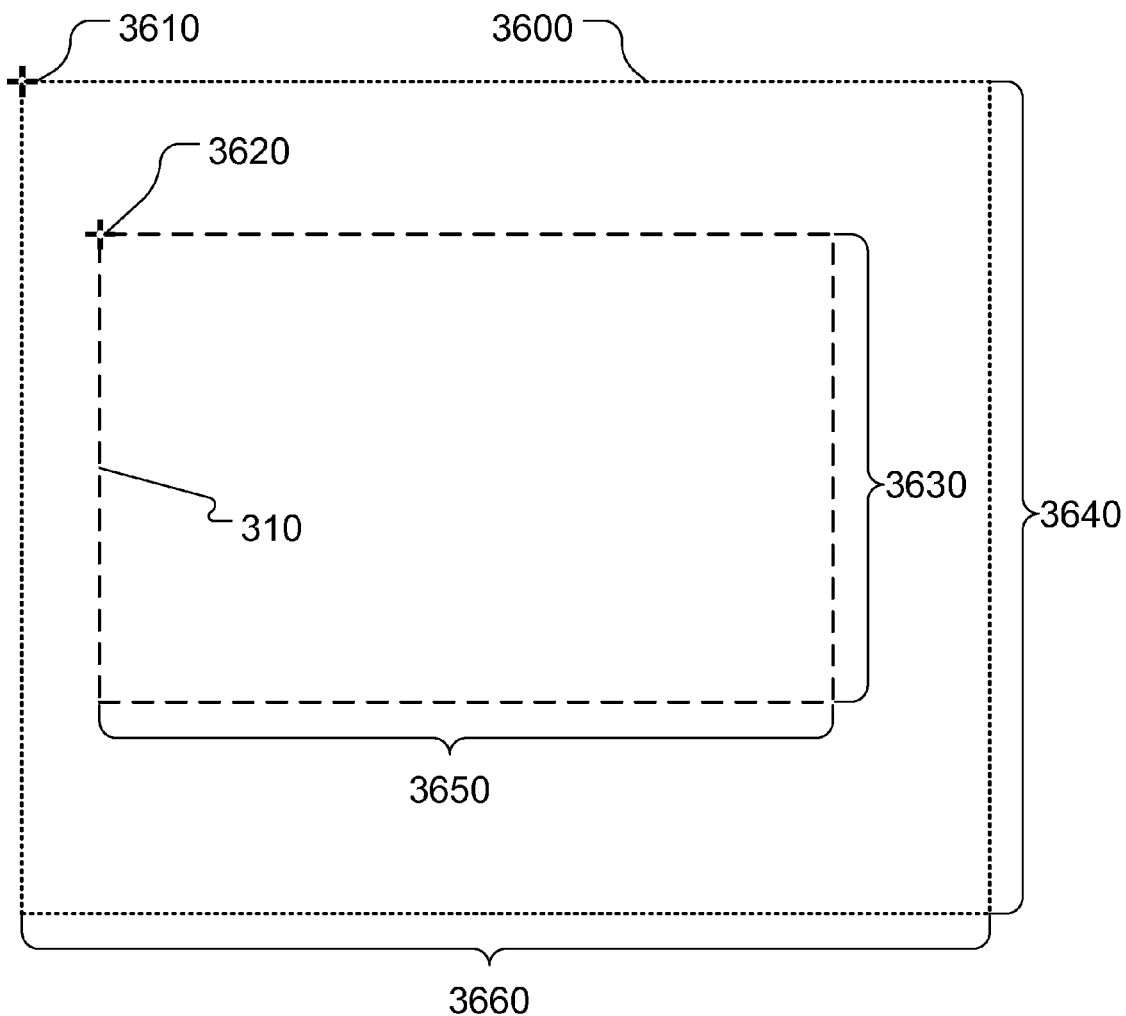
FIG. 36 is an illustration of a viewport on a content.

FIG. 36 is an illustration of a viewport 310 on a content 3600. Both the viewport and the content have coordinate systems. The viewport coordinate system has its origin at point 3620, while the content coordinate system has its origin at point 3610. Point 3620 also has a position in the content coordinate system, as do currently all points within the viewport. The viewport has a height 3630 and a width 3650, the content a height 3640 and a width 3660. Both the viewport height and the viewport width can be expressed in viewport coordinates (VP_H, VP_W) and in content coordinates (VP_CH, VP_CW), just as the content height and the content width can be expressed in either coordinate system. The relationship between these two expressions, e.g. between VP_CH and VP_H gives a translation factor A $$\left(A = \frac{VP\_CH}{VP\_H}\right).$$

Figure 37:
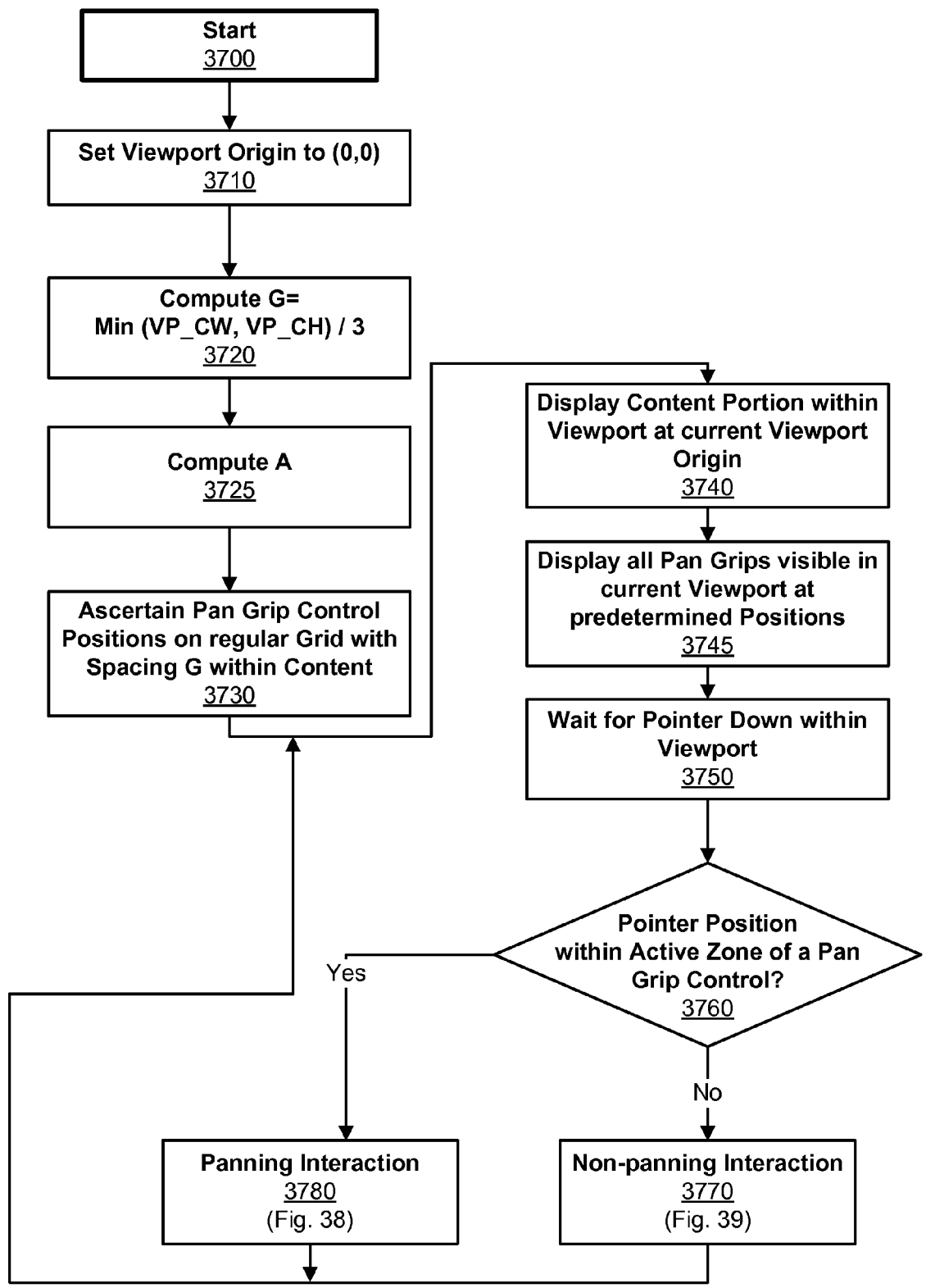
FIG. 37 is a flow of an embodiment.

FIG. 37 shows a flow of an embodiment of pan grip controls. The flow starts 3700 by setting 3710 the viewport origin to coordinates (0, 0). Then a spacing G is computed 3720 by dividing the smaller of the viewport height and the viewport width by 3. Then the translation factor A is computed 3725. Then pan grip controls are ascertained 3730 within the content on a regular grid with a spacing of G. The portion of content within the viewport at the current viewport origin is displayed 3740. All pan grip controls visible in the current viewport at their predetermined positions are displayed 3745. The flow then waits for a pointer down event within the viewport, as indicated by block 3750. Upon a pointer down event it is determined whether the pointer position is within the active zone of a pan grip control, as indicated by block 3760. If this is not the case then the flow continues with non-panning interaction (see description of FIG. 39) and then returns to displaying 3740 the portion of content within the viewport at the current viewport origin. If the pointer position is determined to be within the active zone of a pan grip control, as also indicated by decision block 3760 then the flow continues with panning interaction (see description of FIG. 38) and then returns to displaying 3740 the portion of content within the viewport at the current viewport origin.

Figure 39:
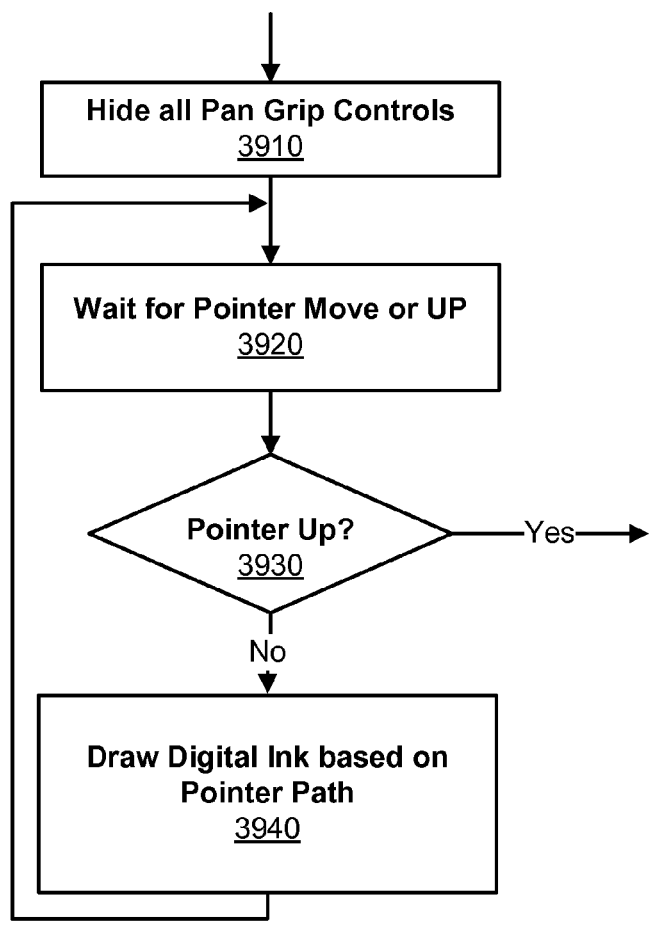
FIG. 39 is a flow of an embodiment.

FIG. 39 illustrates the flow for the non-panning interaction part of the flow illustrated in FIG. 37. The flow is entered after the pointer positions has been determined in step 3760, in FIG. 37, not to be with the active zone of a pan grip control. All pan grip controls are hidden 3910. The flow then continues by waiting 3920 for a pointer move or up event. If a pointer up event is determined, then the non-panning interaction part ends and the flow returns to displaying 3740 the portion of content within the viewport at the current viewport origin (see FIG. 37). If it is determined 3930 that there is no pointer up event, then digital ink is drawn 3940 into the content based on the pointer path. The flow then returns to waiting 3920 for a pointer move or pointer up event.

It will be appreciated that while here digital inking is described for a non-panning interaction with the displayed content, this is done for illustrative purposes only, and other kinds of non-panning interaction may equally be employed.

Figure 38:
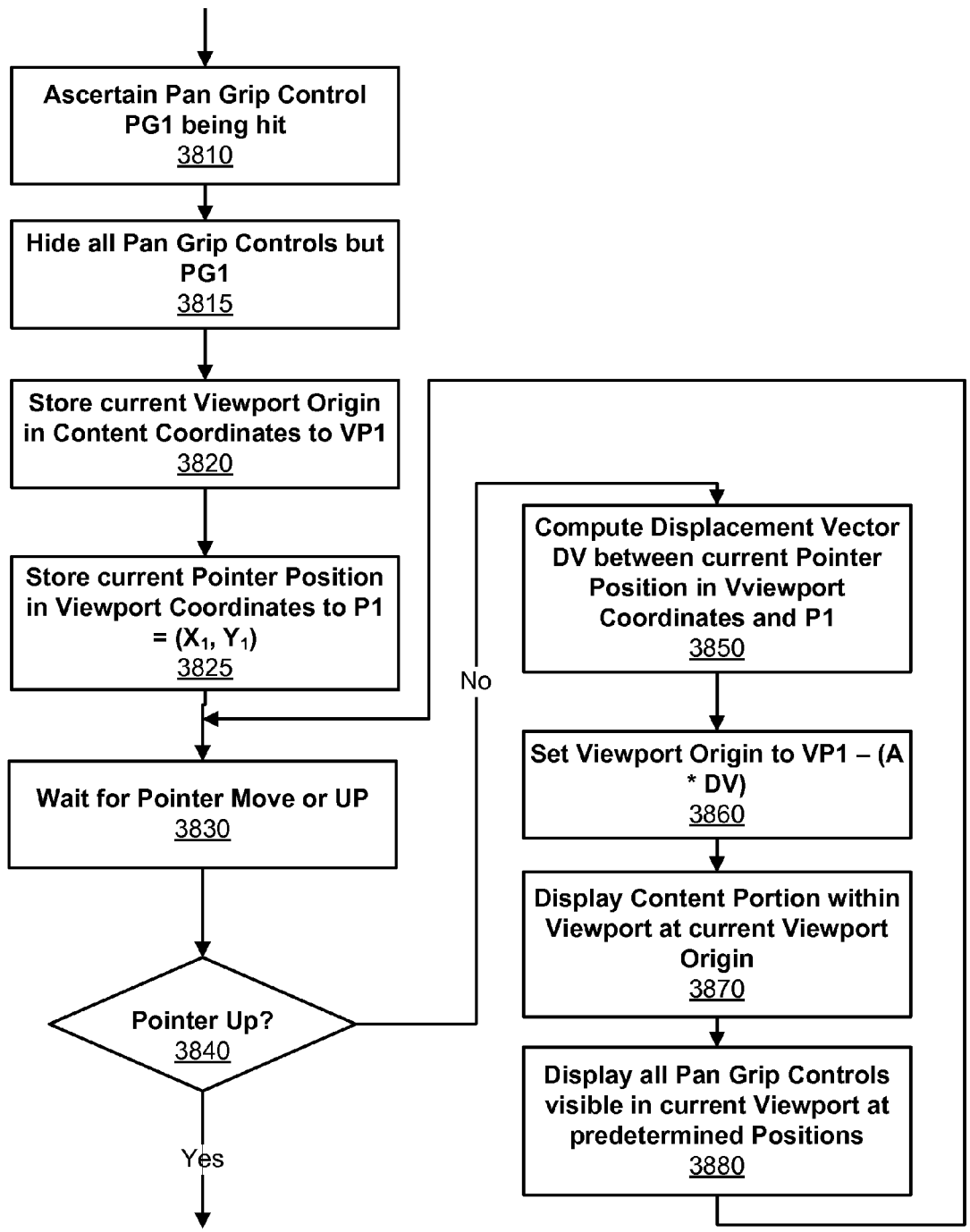
FIG. 38 is a flow of an embodiment.

FIG. 38 illustrates the flow for the panning interaction part of the flow illustrated in FIG. 37. The flow is entered after the pointer positions has been determined in step 3760, in FIG. 37, to be with the active zone of a pan grip control. The pan grip control PG that is hit by the pointer is ascertained 3810. Then all pan grip controls except for pan grip control PG1 are hidden 3815. The current viewport origin coordinates are stored 3820 to VP1. The current pointer position in viewport coordinates is stored 3825 to P1. The flow then waits 3830 for a pointer up or a pointer move event. If a pointer up event is determined 3840, then the panning interaction part ends and the flow returns to displaying 3740 the portion of content within the viewport at the current viewport origin (see FIG. 37). If no pointer up event is determined 3840, then the displacement vector DV between the current pointer position in viewport coordinates and P1 is computed 3850. The viewport origin is then set 3860 to VP1−A*DV. The portion of content within the viewport at this updated viewport origin is then displayed 3870. All pan grips visible within the current viewport are displayed 3880 at their predetermined positions. The flow then returns to waiting 3830 for a pointer up or a pointer move event.

What is claimed is:

1. A computing device, facilitating modeless panning, comprising:
a display;
one or more processors coupled to said display; and
a memory coupled to the one or more processors, the memory storing instructions that, when executed by the one or more processors, cause the one or more processors to:
display a portion of content in a viewport on the display, the content being larger than said viewport;
present a plurality of pan grip controls overlying the content in the viewport, the pan grip controls having predetermined positions relative to the content as displayed in the viewport;
wherein said positions are part of a pattern which extends across the viewport and
each pan grip control has one or more respective active zones receptive to user input and a respective graphical representation;
receive a pan initiation input in an active zone of a pan grip control;
receive a pan control input starting in an active zone of said pan grip control subsequent to the pan initiation input,
pan the viewport in response to the received pan control input,
wherein the panning in response to the pan control input received on said pan grip control has two degrees of freedom, and
the pan grip controls retain their predetermined positions relative to the content as displayed in the viewport;
receive a non-panning input on the displayed content outside of the active zones of the pan grip controls; and
interact with the displayed content in response to the non-panning input.

2. The computing device of claim 1, wherein the pan initiation input includes a pointer down event in an active zone of the pan grip control.

3. The computing device of claim 1, wherein the pan control input includes a dragging of the pan grip control.

4. The computing device of claim 1, wherein the pan control input includes a dragging of pan grip control without an intermediate pointer event after the pan initiation input.

5. The computing device of claim 1, wherein the non-panning interaction with the displayed content is at least one of digital inking, inputting text, creating a graphical object, adding further content to the displayed content, highlighting at least a portion of the displayed content, tagging a part of the displayed content, selecting at least one object in the displayed content, cutting and copying from the displayed content, pasting into the displayed content, erasing or moving an element of the displayed content, altering the appearance of a part of the displayed content, interacting with an active element in the displayed content, and rotating or scaling the displayed content.

6. The computing device of claim 1, wherein the instructions stored in the memory further cause the one or more processors to:
present the pan grip controls in a predetermined, regular pattern that is independent of the displayed content.

7. The computing device of claim 1, wherein the instructions stored in the memory further cause the one or more processors to hide the pan grip controls during a non-panning interaction with the displayed content.

8. The computing device of claim 7, wherein the instructions stored in the memory further cause the one or more processors to keep the plurality of pan grip controls hidden for a predetermined period of time after a non-panning interaction with the displayed content has stopped.

9. The computing device of claim 1, wherein the instructions stored in the memory further cause the one or more processors to:
initiate a panning that is a kinetic panning when the pan control input is determined to end with a flick;
accept one or more additional flicks anywhere in the viewport during kinetic panning, said one or more additional flicks influencing the direction and/or the speed of the kinetic panning; and
stop the kinetic panning in response to a pointer down event anywhere the viewport that is not part of another flick.

10. The computing device of claim 1, wherein the instructions stored in the memory further cause the one or more processors to hide the pan grip controls during panning, except for a pan grip control receiving a pan control input.

11. The computing device of claim 1, wherein the instructions stored in the memory further cause the one or more processors to alter the graphical representations of the pan grip controls to give a visual indication to the user of at least one of a direction in which the viewport can be panned, a distance in which the viewport can be panned, a size of the content relative to a size of the viewport, a current mode of operation for non-panning interaction with the displayed content, and a program state.

12. The computing device of claim 1, wherein the display and the pointing device are combined in a touch screen.

13. The computing device of claim 1, wherein the viewport extends over the entire area of the display.

14. The computing device of claim 1, wherein the instructions stored in the memory further cause the one or more processors to:
receive a user input that is neither a pan initiation input nor a pan control input in an active zone of one of the pan grip controls; and
interact with the displayed content as a non-panning interaction in response to said user input.

15. The computing device of claim 1, wherein the instructions stored in the memory further cause the one or more processors to:
receive a pan control suspend input in an active zone of a given pan grip control; and
interpret at least one subsequent user input in an active zone of the given pan grip control as
a non-panning input that interacts with the displayed content.

16. The computing device of claim 15, wherein the instructions stored in the memory further cause the one or more processors to hide the pan grip controls following the pan control suspend input.

17. A computing device, comprising
a display;
one or more processors coupled to said display and the pointing device; and a memory coupled to the one or more processors, the memory storing instructions that, when executed by the one or more processors, cause the one or more processors to:

display a viewport, said viewport displaying a portion of content
wherein the content is larger than the viewport; and present a plurality of pan grip control parts of the viewport that are receptive to panning input that controls panning of the viewport, the pan grip control parts established at positions relative to the content as displayed in the viewport; and one or more non-pan grip control parts of the viewport that are outside of the pan grip control parts,
wherein the one or more non-pan grip control parts of the viewport are receptive to a non-panning input that facilitates interaction with the displayed content;
the positions of the pan grip control parts are part of a pattern which extends across the viewport
the panning in response to the pan control input received on a pan grip control part has two degrees of freedom, and
the pan grip control parts, during the panning of the viewport, maintain their positions relative to the content as displayed in the viewport.

18. The computing device of claim 17, wherein the panning is initiated by a pointer down event in a pan grip control part of the viewport and controlled by a dragging of a pan grip control part of the viewport.

19. The computing device of claim 17, wherein the panning is controlled by a dragging of the pan grip control part of the viewport upon which the panning was initiated that immediately follows said initiation without an intermediate pointer event.

20. The computing device of claim 17, wherein the non-panning interaction with the displayed content is at least one of digital inking, inputting text, creating a graphical object, adding further content to the displayed content, highlighting at least a portion of the displayed content, tagging a part of the displayed content, selecting at least one object in the displayed content, cutting and copying from the displayed content, pasting into the displayed content, erasing or moving an element of the displayed content, altering the appearance of a part of the displayed content, interacting with an active element in the displayed content, and rotating or scaling the displayed content.

21. The computing device of claim 17, wherein the pan grip control parts of the viewport are established in a predetermined, regular pattern that is independent of the displayed content.

22. The computing device of claim 17, wherein the instructions stored in the memory further cause the one or more processors to hide the plurality of the pan grip control parts during a non-panning interaction with the displayed content and keep them hidden for a predetermined period of time after the non-panning interaction with the displayed content has stopped.

23. The computing device of claim 17, wherein the instructions stored in the memory further cause the one or more processors to:
receive a user input that is not a panning input in a pan grip control part of the viewport; and
interact with the displayed content in response to said user input.

24. The computing device of claim 17, wherein the instructions stored in the memory further cause the one or more processors to:
receive a pan control suspend input in a pan grip control part of the viewport;
and
interpret at least one subsequent user input in the pan grip control part of the viewport as a non-panning input that interacts with the displayed content.

25. A non-transitory computer-readable medium storing instructions that, when executed by a computer, cause the computer to:
display a portion of content in a viewport on a display, the content being larger than said viewport;
present a plurality of pan grip controls overlying the content in the viewport, the pan grip controls having predetermined positions relative to the content as displayed in the viewport;
wherein said positions are part of a pattern which extends across the viewport and
each pan grip control has one or more respective active zones receptive to user input
and a respective graphical representation;
receive a pan initiation input in an active zone of a pan grip control;
receive a pan control input starting in an active zone of said pan grip control subsequent to the pan initiation input,
pan the viewport in response to the received pan control input,
wherein the panning in response to the pan control input received on said pan grip control panning has two degrees of freedom, and
the pan grip controls retain their predetermined positions relative to the content as displayed in the viewport;
receive a non-panning input on the displayed content outside of the active zones of the pan grip controls; and
interact with the displayed content in response to the non-panning input.

26. The computer-readable medium of claim 25, wherein the pan initiation input includes a pointer down event in an active zone of the pan grip control and the pan control input includes a dragging of the pan grip control.

27. The computer-readable medium of claim 25, wherein the pan control input is a dragging of the pan grip control that immediately follows said pan initiation input without an intermediate pointer event.

28. The computer-readable medium of claim 25, wherein the non-panning interaction with the displayed content is at least one of digital inking, inputting text, creating a graphical object, adding further content to the displayed content, highlighting at least a portion of the displayed content, tagging a part of the displayed content, selecting at least one object in the displayed content, cutting and copying from the displayed content, pasting into the displayed content, erasing or moving an element of the displayed content, altering the appearance of a part of the displayed content, interacting with an active element in the displayed content, and rotating or scaling the displayed content.

29. The computer-readable medium of claim 25, wherein the pan grip controls are presented in a predetermined, regular pattern that is independent of the displayed content.

30. The computer-readable medium of claim 25, further storing instructions that, when executed by a computer, cause the computer to
hide the pan grip controls during the non-panning interaction with the displayed content and keep them hidden for a predetermined period of time after the non-panning interaction with the displayed content has stopped.

31. The computer-readable medium of claim 25, further storing instructions that, when executed by a computer, cause the computer to
- receive a user input that is neither a pan initiation input nor a pan control input in an active zone of one of the pan grip controls; and
- interact with the displayed content in response to said user input.

32. The computer-readable medium of claim 25, further storing instructions that, when executed by a computer, cause the computer to
- receive a pan control suspend input in an active zone of a given pan grip control; and
- interpret at least one subsequent user input in an active zone of the given pan grip control as a non-panning input that interacts with the displayed content.

\* \* \* \* \*